US006898485B2

(12) United States Patent
Kuroki et al.

(10) Patent No.: US 6,898,485 B2
(45) Date of Patent: May 24, 2005

(54) DEVICE AND METHOD FOR CONTROLLING OPERATION OF LEGGED ROBOT, AND ROBOT DEVICE

(75) Inventors: Yoshihiro Kuroki, Kanagawa (JP); Tatsuzo Ishida, Tokyo (JP); Jinichi Yamaguchi, Tama Research Institute 5-14-38, Tamadaira, Hino-shi, Tokyo (JP)

(73) Assignees: Sony Corporation, Tokyo (JP); Jinichi Yamaguchi, Tokyo (JP)

( * ) Notice: Subject to any disclaimer, the term of this patent is extended or adjusted under 35 U.S.C. 154(b) by 267 days.

(21) Appl. No.: 10/181,500

(22) PCT Filed: Nov. 16, 2001

(86) PCT No.: PCT/JP01/10012

§ 371 (c)(1), (2), (4) Date: Nov. 13, 2002

(87) PCT Pub. No.: WO02/45913

PCT Pub. Date: Jun. 13, 2002

(65) Prior Publication Data

US 2003/0120388 A1 Jun. 26, 2003

(30) Foreign Application Priority Data

Nov. 20, 2002 (JP) ...................................... 2000-353249

(51) Int. Cl.[7] ................................................ G05B 19/00

(52) U.S. Cl. ...................... 700/245; 318/568.11; 901/1; 901/15; 901/47; 701/23

(58) Field of Search ....................... 318/568.11, 568.12, 318/568.15, 568.16, 568.17, 568.18, 568.22, 565, 568.1; 901/1, 15, 47, 9, 48, 33; 701/23; 700/245, 248, 258, 259, 247, 249, 250, 252, 253, 260, 264, 251

(56) References Cited

U.S. PATENT DOCUMENTS 6,243,623 B1 * 6/2001 Takenaka et al. ........... 700/245
6,289,265 B1 * 9/2001 Takenaka et al. ........... 700/245
6,583,595 B1 * 6/2003 Hattori et al. .............. 318/567
6,697,709 B2 * 2/2004 Kuroki et al. .............. 700/245
2003/0173926 A1 * 9/2003 Hattori et al. .............. 318/567

FOREIGN PATENT DOCUMENTS

| | | |
|---|---|---|
| EP | 1 053 835 | 11/2000 |
| JP | 7-205069 | 8/1995 |
| JP | 7-205070 | 8/1995 |
| JP | 10-277969 | 10/1998 |
| JP | 3055737 | 4/2000 |
| WO | WO 98/33629 | 8/1998 |

OTHER PUBLICATIONS

Hirai et al., The development of Honda humanoid robot, 1998, IEEE, pp. 1321–1326.*

Kanehiro et 1., Development of a two–armed bipedal robot that can walk and carry objects, 1996, IEEE, pp. 23–28.*

* cited by examiner

*Primary Examiner*—Thomas G. Black
*Assistant Examiner*—McDieunel Marc
(74) *Attorney, Agent, or Firm*—Frommer Lawrence & Haug LLP; William S. Frommer

(57) ABSTRACT

A robot to operate accurately while canceling an affect of pitch-axis, roll-axis, and yaw-axis moments, these moments being applied on the robot body during a leg-moving operation such as walking. First, by calculating a pitch-axis moment and/or a roll-axis moment generated on the robot body at a preset ZMP by set motions of upper limbs, a trunk, and lower limbs, motions of the lower limbs and the trunk for canceling the pitch-axis moment and/or the roll-axis moment are obtained. Then, by calculating a yaw-axis moment generated on the robot body lying at the preset ZMP by the calculated motions of the lower limbs and the trunk, a motion of the upper limbs for canceling the yaw-axis moment is obtained.

24 Claims, 11 Drawing Sheets

30
35
SUB-CONTROL-LER
50R
50L
80
SUB-CONTROL-LER
MAIN CONTROL-LER
PERIPH-ERAL CIRCUIT
SUB-CONTROL-LER
51R
51L
81
82
55R
55L
SUB-CONTROL-LER
93
ATTITUDE SENSOR
45
52R
52L
40
53R
53L
SUB-CONTROL-LER
SUB-CONTROL-LER
65R
65L
61R
61L
60R
60L
62R
62L
63R
63L
GROUNDING CONFIRMATION SENSOR
GROUNDING CONFIRMATION SENSOR
91
91

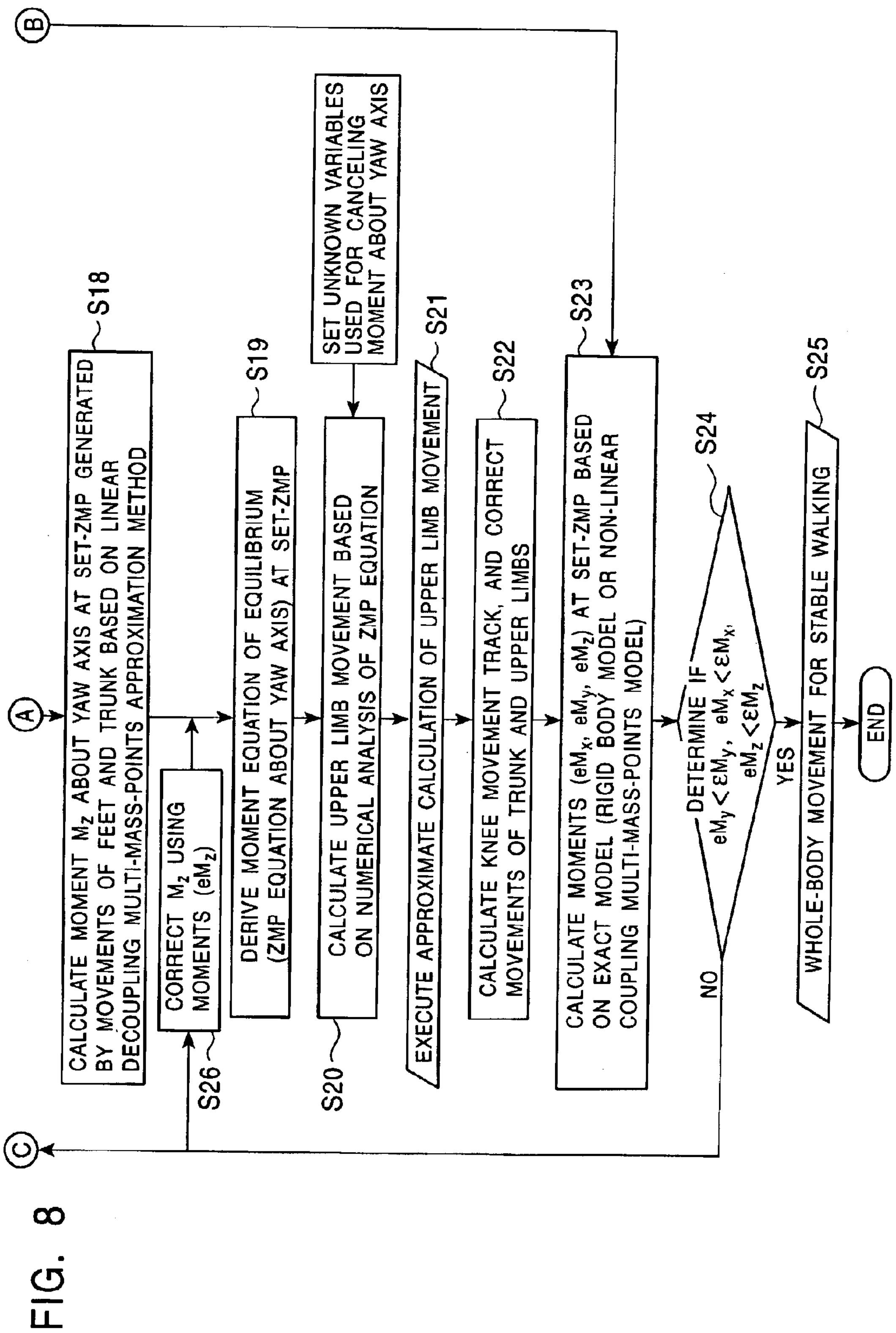
FIG. 8
A
B
C
S18
CALCULATE MOMENT $M_z$ ABOUT YAW AXIS AT SET-ZMP GENERATED BY MOVEMENTS OF FEET AND TRUNK BASED ON LINEAR DECOUPLING MULTI-MASS-POINTS APPROXIMATION METHOD
S26
CORRECT $M_z$ USING MOMENTS ($eM_z$)
S19
DERIVE MOMENT EQUATION OF EQUILIBRIUM (ZMP EQUATION ABOUT YAW AXIS) AT SET-ZMP
SET UNKNOWN VARIABLES USED FOR CANCELING MOMENT ABOUT YAW AXIS
S20
CALCULATE UPPER LIMB MOVEMENT BASED ON NUMERICAL ANALYSIS OF ZMP EQUATION
S21
EXECUTE APPROXIMATE CALCULATION OF UPPER LIMB MOVEMENT
S22
CALCULATE KNEE MOVEMENT TRACK, AND CORRECT MOVEMENTS OF TRUNK AND UPPER LIMBS
S23
CALCULATE MOMENTS ($eM_x$, $eM_y$, $eM_z$) AT SET-ZMP BASED ON EXACT MODEL (RIGID BODY MODEL OR NON-LINEAR COUPLING MULTI-MASS-POINTS MODEL)
S24
DETERMINE IF $eM_y<\varepsilon M_y$, $eM_x<\varepsilon M_x$, $eM_z<\varepsilon M_z$
NO
YES
S25
WHOLE-BODY MOVEMENT FOR STABLE WALKING
END

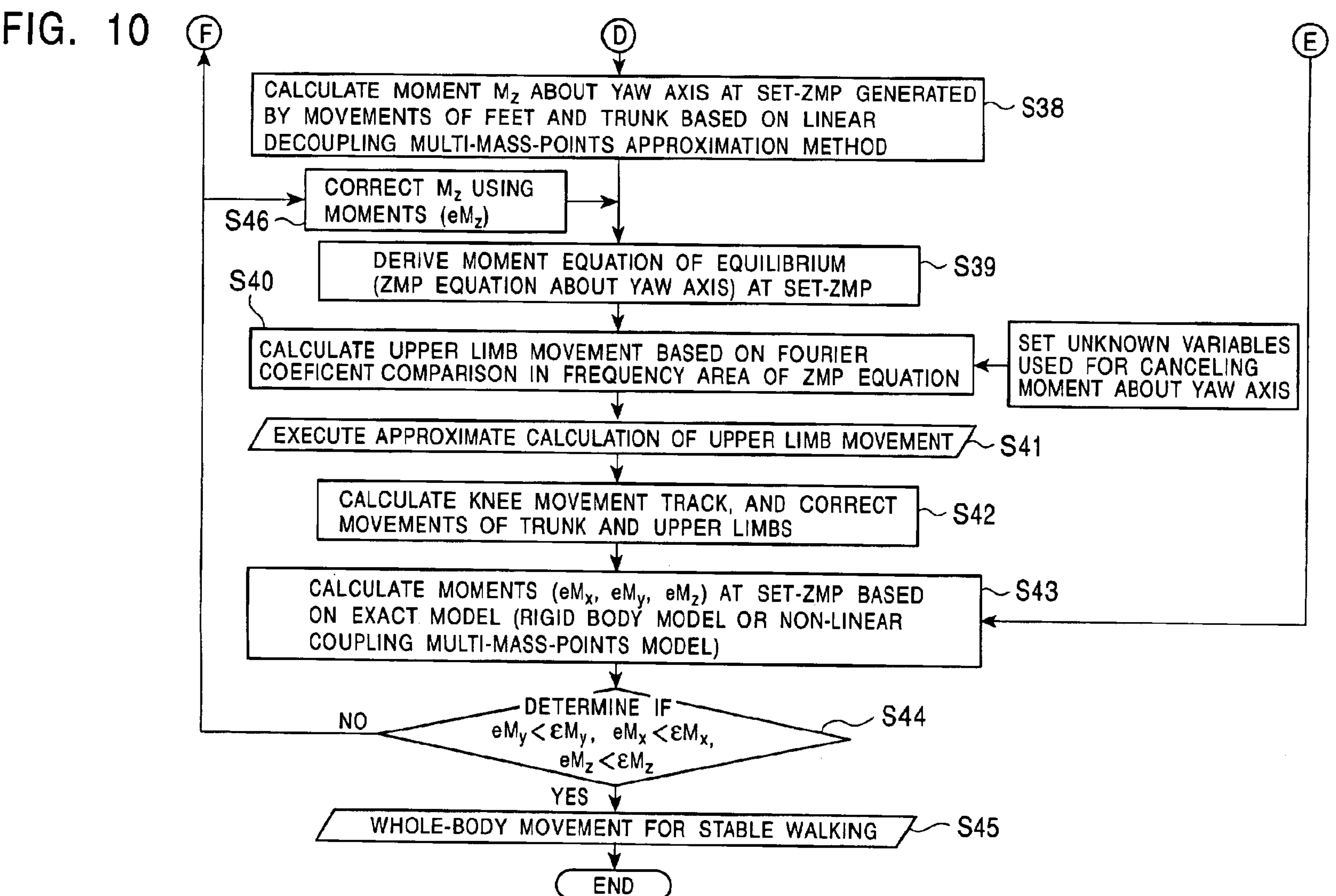

FIG. 10
F
D
E
CALCULATE MOMENT $M_Z$ ABOUT YAW AXIS AT SET-ZMP GENERATED BY MOVEMENTS OF FEET AND TRUNK BASED ON LINEAR DECOUPLING MULTI-MASS-POINTS APPROXIMATION METHOD
S38
CORRECT $M_Z$ USING MOMENTS ($eM_Z$)
S46
DERIVE MOMENT EQUATION OF EQUILIBRIUM (ZMP EQUATION ABOUT YAW AXIS) AT SET-ZMP
S39
S40
CALCULATE UPPER LIMB MOVEMENT BASED ON FOURIER COEFICENT COMPARISON IN FREQUENCY AREA OF ZMP EQUATION
SET UNKNOWN VARIABLES USED FOR CANCELING MOMENT ABOUT YAW AXIS
EXECUTE APPROXIMATE CALCULATION OF UPPER LIMB MOVEMENT
S41
CALCULATE KNEE MOVEMENT TRACK, AND CORRECT MOVEMENTS OF TRUNK AND UPPER LIMBS
S42
CALCULATE MOMENTS ($eM_X$, $eM_Y$, $eM_Z$) AT SET-ZMP BASED ON EXACT MODEL (RIGID BODY MODEL OR NON-LINEAR COUPLING MULTI-MASS-POINTS MODEL)
S43
NO
DETERMINE IF $eM_Y<\varepsilon M_Y$, $eM_X<\varepsilon M_X$, $eM_Z<\varepsilon M_Z$
S44
YES
WHOLE-BODY MOVEMENT FOR STABLE WALKING
S45
END

DEVICE AND METHOD FOR CONTROLLING OPERATION OF LEGGED ROBOT, AND ROBOT DEVICE

TECHNICAL FIELD

The present invention relates to motion controllers and motion control methods for a realistic robot having a structure imitating a mechanism or a motion of a living body, and in particular to motion controllers and motion control methods for a legged walking robot having a structure imitating a mechanism or a motion of the likes of a human and an ape who walk erect.

More particularly, the present invention relates to a motion controller and a motion control method for a legged walking robot which stably and accurately performs a leg-moving operation such as high-speed walking, and yet in particular to a motion controller and a motion control method for a legged walking robot which operates stably and accurately while canceling an affect of roll-axis, pitch-axis and yaw-axis moments applied on the robot body during a leg-moving operation.

BACKGROUND ART

A mechanical apparatus performing a motion that imitates a human motion by using an electric or magnetic effect is called a ROBOT. The etymology of ROBOT is said to be originated in Slavic "ROBOTA (a slave machine)". Although robots have been widely used in Japan since the end of the 1960s, most robots are industrial robots such as manipulators and transport robots used for automated production and non-man production at factories.

Stationary robots such as arm robots installed fixedly at specific sites perform operations such as a parts-assembling operation and a sorting operation only in a fixed and local working space. On the other hand, mobile robots perform operations in an unlimited working space such as acting for a prescribed or unprescribed human operation by moving flexibly along a predetermined route or without a route, and offer a variety of services that substitute for a human, a dog and other animate things. Among others, legged walking robots have advantages in moving up and down stairs and a ladder, walking over an obstacle, and a flexible walk and walking motion regardless of leveled and unleveled terrain, although these robots are more unstable and more difficult in controlling an attitude and a walk than crawler-type robots and tired mobile robots.

Recently, research and development of legged walking robots such as pet robots imitating a body mechanism and a motion of quadruped walking animals such as a cat and a dog, and human-shaped robots, i.e., humanoid robots designed by modeling after a body mechanism and a motion of biped walking animals such as a human have advanced, and thus expectations for actual use have been increasingly built up.

The following two are exemplary viewpoints from which the importance of research and development of a biped walking robot called a human-shaped robot, i.e., a humanoid robot is understood.

One is a viewpoint from human science. More particularly, fabricating a robot having a structure imitating human lower limbs and/or upper limbs and devising the control method therefor lead to technologically solving a mechanism of natural human motions including walking through a simulation process of the human motions. Such study is expected to significantly contribute to promoting a variety of other research fields for human athletic mechanisms such as ergonomics, rehabilitation technology, and sports science.

The other is a viewpoint from the development of practical robots for supporting living activities as a partner of man, that is, for supporting human activities in various daily environments including a living environment. Such kinds of robots are required to learn the way of adapting to people, each having different personalities, or to different environments while being taught by the people, and to further develop the functions thereof in various aspects of human living environments. A human-shaped robot or a robot having the same shape or the same structure with man is expected to function effectively for smooth communication with man.

For example, when teaching a robot the way of passing through a room on site while avoiding an obstacle on which the robot must not step, an operator expects to more easily teach the above-mentioned way to a biped walking robot having a similar shape with that of the operator than to a crawler-type robot or a quadruped robot having a structure totally different from that of the operator. Also, it must be the easy way for the robot to be taught (for example, refer to Takanishi: Control of Biped walking robot, Society of Automotive Engineers of Japan, Kanto Charter, <KOSO> No. 25, April 1996).

A large number of attitude control and stable walk technologies about biped-walking legged walking robots have been proposed. The stable walk mentioned above is defined as a legged locomotion without falling down.

An attitude stabilization control of a robot is extremely important for preventing the robot from falling down, because falling-down leads to suspending the performing operation of the robot and also requires a considerable amount of labor and time for standing up and restarting the operation from falling down. More importantly, falling-down of the robot causes a risk of a fatal damage to the robot itself or to an opposing obstacle colliding with the falling robot. Accordingly, the attitude stabilization control for walking and other leg-moving operations is the most important technical matter in designing and developing a legged walking robot.

While walking, a gravitational force, an inertia force, and a moment due to these forces from a walking system act on a road surface because of a gravity and an acceleration caused by a walking motion. According to a so-called D'Alambert principle, these forces and the moment balance a floor reaction force and moment as a reaction from the road surface to a walking system. As a result of the dynamic deduction, a supporting polygon formed by the grounding points of foot bottoms and the road surface has a point at which pitch-axis and roll-axis moments are zero, in other words, a (ZMP) zero moment point on the sides of or inside the supporting polygon.

Most proposals about the attitude stabilization controls and falling prevention of legged walking robots use this ZMP as a criterion for determining walking stability. Generation of a biped walking pattern based on the ZMP criterion has advantages in easily considering a toe condition of kinematic constraints in accordance with a road surface profile and the like since the grounding point of the foot bottom can be preset. Using ZMP as a criterion for determining stability means that a trajectory instead of a force is used as a target value for a motion control, thereby increasing the technical feasibility of the robot. A general idea of ZMP and an application of ZMP to a criterion for determining stability of a walking robot are described in "LEGGED LOCOMOTION ROBOTS" written by Miomir Vukobratovic ("Walking Robot and Artificial Leg" written by Ichiro Kato, et al., Business & Technology).

In general, a biped walking robot such as a humanoid robot has a center of gravity at a higher position and a narrower ZMP region for stable walking than a quadruped walking robot. Therefore, such an issue of an attitude variation depending on a road surface profile is especially important to the biped walking robot.

Some proposals using ZMP as a criterion for determining attitude stability of a biped walking robot are disclosed.

For example, a legged walking robot stated in Japanese Unexamined Patent Application Publication No. 5-305579 performs stable walking by allowing a point, on a floor at which ZMP is zero, to agree with a target value.

A legged walking robot stated in Japanese Unexamined Patent Application Publication No. 5-305581 is configured such that ZMP lies in the supporting polyhedron (polygon) or such that when landing or taking off the floor, ZMP lies in a region apart from the edges of the supporting polygon at least by a predetermined allowable distance. In the latter case, walking stability of the robot body against a disturbance increases because of the predetermined allowable distance of ZMP.

A method for controlling a walking speed of a legged walking robot by using a ZMP target point is disclosed in Japanese Unexamined Patent Application Publication No. 5-305583. More particularly, leg joints are driven for allowing ZMP to agree with the target point by using preset walking pattern data, and the rate of outputting the walking pattern data set in accordance with a detected value of an inclination of the upper body is changed. When the robot steps on an unknown irregularity and leans forward, for example, the robot regains its normal attitude by increasing the outputting rate. Also, changing the outputting rate during standing with two legs does not matter since ZMP is controlled as a target point.

A method for controlling a landing point of a legged walking robot by using a ZMP target point is disclosed in Japanese Unexamined Patent Application Publication No. 5-305585. More particularly, the legged walking robot stated here achieves stable walking such that a distance between the ZMP target point and the measured point is detected and at least one of the legs is driven so as to cancel the distance or such that a moment about the ZMP target point is detected and the legs are driven so as to cancel the moment.

A method for controlling a tilted attitude of a legged walking robot by using a ZMP target point is disclosed in Japanese Unexamined Patent Application Publication No. 5-305586. More particularly, the legged walking robot performs stable walking such that a moment about the ZMP target point is detected and the legs are driven so as to cancel the detected moment.

As described above, the essence of the attitude stability control of the robots which use ZMP as a stability determination criterion is to compute a point, at which a pitch-axis moment and a roll-axis moment are zero, on the sides of or inside a supporting polygon formed by grounding points of foot bottoms and a road surface.

However, a prior study conducted by the inventors, et al. reveals that when a robot performs a legged motion at high speed, a moment about yaw axis, i.e., about Z-axis is generated on the robot body in addition to pitch-axis and roll-axis moments.

FIG. 11 illustrates the exemplary relationship between a walking speed (s/step) and a moment generated about a yaw axis (Nm) of a biped walking robot. The drawing indicates that the shorter the time for one stride of the legged walking robot, that is, the higher the walking speed, the more significantly the yaw-axis moment increases.

Such a yaw-axis moment acts to rotate the robot body in the course of time, thereby causing a slip about yaw axis between the foot bottom of the robot and the road surface. This slip becomes an obstacle such as affecting the walking stability for stably and accurately achieving an expected leg-moving operation. Furthermore, an extremely significant affect of this yaw-axis moment may cause the robot to fall down and accordingly may involve damage of the robot body or the obstacle colliding with the robot.

For example, disclosed in the specification of Japanese Patent Application No. 2000-206531 which has been already assigned to the same assignee is a method for producing a whole-body motion pattern, in which a stable walk of a biped walking robot is achieved, by deriving a waist motion pattern based on an unprescribed foot motion pattern, ZMP trajectory, trunk motion pattern, and upper limb motion pattern. According to a walk controller and a walk control method of the robot stated in this specification, the locomotion of the lower limbs for stable walking is determined even when the robot lies in any of variously different states such as a standing-straight-and-stiff state and a normal walking state. In particular, when a body gesture motion and a hand waving motion are applied in a standing-straight-and stiff state, the locomotion of the lower limbs for stable walking is determined in response to such locomotion of the upper body.

However, although a method for deriving a whole-body coordinated motion for stable walking by canceling roll-axis and pitch-axis moments $M_x$ and $M_y$ generated on the robot body at the preset ZMP by motions of the feet, the trunk, and the upper limbs of the robot is stated in this specification, a yaw-axis moment $M_z$ generated during the whole-body coordinated motion is not considered.

To overcome the above problem, a method is also considered in which after a slip about the yaw axis of the robot body is detected by a sensor or the like, a compensation control for canceling the yaw-axis moment is performed by swinging arms and the like. However, the compensation control is performed in an ex-post manner in this case, thereby always giving rise to a problem of a more or less degree of slippage.

Also, since a motion of swinging arms and the like is a motion in a plane irrelevant of a force of gravity, a control for placing the arms into desired positions is needed after the moment is canceled.

Moreover, human-shaped arms configured by rotational joints having a common motion in the Z-axis direction are likely to cause pitch-axis and roll-axis moments which damage the stability of the robot when the arms are swung for canceling the yaw-axis moment.

That is to say, swinging the arms for suppressing the yaw-axis slippage in an ex-post manner gives rise to a problem of causing unstable walking while overcoming the problem of the slippage about the yaw axis.

Since this phenomenon is more significant especially when the robot performs a motion at a higher speed, the above control method is not suitable for a robot moving (running) at a high speed.

In addition, generating only a yaw-axis moment by using human-shaped arms is likely to produce a non-human and unnatural motion (for example, a motion turning a barbell in a horizontal plane so as not to generate a motion in the Z-axis direction), accordingly this problem is crucial for an entertainment robot putting importance on power of expression.

DISCLOSURE OF INVENTION

An object of the present invention is to provide an excellent motion controller, an excellent motion control method, and a robot apparatus for a legged walking robot having a structure imitating a walking-erect body mechanism and motion.

Another object of the present invention is to provide an excellent motion controller, an excellent motion control method, and a robot apparatus for a legged walking robot that stably and accurately achieves a leg-moving operation such as high-speed walking.

Yet another object of the present invention is to provide an excellent motion controller, an excellent motion control method, and a robot apparatus for a legged walking robot that stably and accurately drives the robot body while canceling an affect of roll-axis, pitch-axis and yaw-axis moments applied on the robot body during a leg-moving operation.

The present invention is made in view of the above objects. According to a first aspect of the present invention, a motion controller or a motion control method for a robot that comprises at least upper limbs, a trunk, and lower limbs and that performs a legged locomotion with the lower limbs comprises:

means for or a step of setting motions of at least one of the upper limbs, the trunk, and the lower limbs;

means for or a step of calculating a yaw-axis moment of the body of the legged walking robot, the moment being generated at a preset ZMP by the set motions of the upper limbs, the trunk, and the lower limbs;

means for or a step of calculating a motion of the upper limbs for canceling the yaw-axis moment; and means for or a step of modifying the set motions of the upper limbs, the trunk, and the lower limbs in accordance with the calculated motion of the upper limbs.

As explained in Background Art, especially in a biped-walking legged walking robot, a yaw-axis moment applied on the robot body significantly increases as the walking speed of the robot increases. Such a yaw-axis moment can be an obstacle for achieving a stable and accurate leg-moving operation by causing the robot body to turn, slip about yaw-axis against the road surface, and furthermore lose its balance and fall down.

According to the motion controller and the motion control method for the legged walking robot in accordance with the first aspect of the present invention, the yaw-axis moment generated on the robot body at the preset ZMP can be canceled by the upper limb motion when a motion pattern of the robot body consisting of the combined motions of the lower limbs, the trunk, and the upper limbs is performed.

According to the motion controller and the motion control method for the legged walking robot in accordance with the first aspect of the present invention, the robot body substantially does not slip about the yaw axis since the motion is generated beforehand such that the yaw-axis moment at ZMP is substantially zero and accordingly the robot body is extremely unlikely to slip about the yaw axis. Especially, this is an essential technology for an entertainment robot that puts an emphasis on its own motion. When a yaw-axis moment is applied on the robot, the motions about the pitch and roll axes are also not generated by the motion for canceling the yaw-axis moment since the motions in the three planes of the pitch, roll, and yaw axes are solved at the same time.

Accordingly, while continuing a leg-moving operation with the lower limbs or the trunk, the stability for walking or other leg-moving operations are maintained by the upper limbs.

More particularly, the upper limb motion is a motion achieved by driving the shoulder joints or the elbow joints of the robot. Although the right and left upper limbs move typically in a reverse phase to each other, the present invention is not limited to this way of motion.

In accordance with the body design of a general biped-walking-erect robot, since the shoulder joints and the elbow joints have a wider moveable angle than the trunk (for example, the trunk yaw-axis), such an upper limb motion allows the robot to achieve advanced attitude stability by effectively and highly accurately canceling the yaw-axis moment on the robot body.

Also, such an upper limb motion contributes to a well-produced performance, for example, a demonstration of the motion of the upper half of the robot body with a rich expression.

In accordance with a second aspect of the present invention, a motion controller or a motion control method for a robot that comprises at least upper limbs, a trunk, and lower limbs and that performs a legged locomotion with the lower limbs comprises:

means for or a step of setting motions of at least one of the upper limbs, the trunk, and the lower limbs;

means for or a step of calculating a pitch-axis moment and/or a roll-axis moment of the body of the legged walking robot, these moments being generated at a preset ZMP by the set motions of the upper limbs, the trunk, and the lower limbs;

means for or a step of calculating motions of the lower limbs and the trunk for canceling the pitch-axis moment and/or the roll-axis moment;

means for or a step of calculating a yaw-axis moment of the body of the legged walking robot, the moment being generated at the preset ZMP by the calculated motions of the lower limbs and the trunk;

means for or a step of calculating a motion of the upper limbs for canceling the yaw-axis moment; and means for or a step of modifying the set motions of the upper limbs, the trunk, and the lower limbs in accordance with the calculated motions of the upper limbs, the trunk, and the lower limbs.

When a biped walking robot performs a whole-body motion consisting of the combined motions of the upper limbs, the trunk, and the lower limbs, moments about the pitch, roll, and yaw axes are generated on the body of the robot.

According to the motion controller and the motion control method in accordance with the second aspect of the present invention, when a motion pattern of the robot body consisting of the combined motions of the upper limbs, the trunk, and the lower limbs is performed, the motions of the lower limbs and the trunk for canceling the pitch-axis moment and/or the roll-axis moment are calculated, and then the motion of the upper limbs for canceling the yaw-axis moment generated at the preset ZMP by the motions of the lower limbs and the trunk is calculated. With these calculations, a whole-body coordinated motion is achieved stably and accurately while canceling the affect of the moments about the roll, pitch, and yaw axes applied on the robot body during an leg-moving operation such as walking.

Especially in a biped walking robot, a yaw-axis moment applied on the robot body significantly increases as the walking speed of the robot increases. Although such a yaw-axis moment can be an obstacle by causing the robot body to turn, slip about the yaw-axis against the road surface, and fall down, this obstacle is suitably avoided in accordance with the second aspect.

Also, according to the motion controller and the motion control method in accordance with the second aspect of the present invention, the robot body substantially does not slip about the yaw axis since the motion is generated beforehand such that the yaw-axis moment at ZMP is substantially zero and accordingly the robot body is extremely unlikely to slip about the yaw axis. When the yaw-axis moment is applied on the robot, the motions about the pitch and roll axes are not generated by the motion for canceling the yaw-axis moment since the motions in the three planes of the pitch, roll, and yaw axes are solved at the same time.

Accordingly, while continuing a leg-moving operation with the lower limbs or the trunk, the stability for walking or other leg-moving operations is maintained by the upper limb motion.

More particularly, the upper limb motion is a motion achieved by driving the shoulder joints or the elbow joints of the robot. It is apparent to one skilled in the art that the spirit of the present invention is not limited to a reverse-phase or symmetrical motion of the right and left upper limbs.

In accordance with the body design of a general biped-walking-erect robot, since the shoulder joints and the elbow joints have a wider moveable angle than the trunk (for example, the trunk yaw-axis), such an upper limb motion allows the robot to achieve advanced attitude stability by effectively and highly accurately canceling the yaw-axis moment on the robot body. Also, such an upper limb motion contributes to a well-produced performance, for example, a demonstration of the motion of the upper half of the robot body with a rich expression.

In accordance with a third aspect of the present invention, a motion controller or a motion control method for a robot that comprises at least upper limbs, a trunk, and lower limbs and that performs a legged locomotion with the lower limbs comprises:

(a) means for or step of setting at least one of a foot motion, a trunk motion, an upper limb motion, and an attitude and a height of a waist for achieving a requested motion;

(b) means for or step of setting a ZMP trajectory based on the foot motion set by the (a) means or step;

(c) means for or step of calculating pitch-axis and roll-axis moments of the legged walking robot, these moments being generated at the ZMP set by the (b) means or step by the foot motion, the trunk motion, and the upper limb motion set by the (a) means or step;

(d) means for or step of obtaining solution for a waist motion for canceling the pitch-axis and roll-axis moments calculated by the (c) means or step;

(e) means for or step of calculating a yaw-axis moment of the legged walking robot, the moment being generated at the ZMP set by the (b) means or step by the waist motion solved by the (d) means or step;

(f) means for or step of computing a solution for an upper limb motion for canceling the yaw-axis moment calculated by the (e) means or step; and (g) means for or step of deriving a whole-body motion of the legged walking robot based on the waist motion and the upper limb motion solved by the (d) means or step and the (f) means or step, respectively.

According to the motion controller and the motion control method in accordance with the third aspect of the present invention, when a motion pattern of the robot body consisting of the combined motions of the upper limbs, the trunk, and the lower limbs is performed, the motions of the lower limbs and the trunk for canceling the pitch-axis moment and/or the roll-axis moment are calculated, and then the motion of the upper limbs for canceling the yaw-axis moment generated at the preset ZMP by the motions of the lower limbs and the trunk is calculated. With these calculations, a whole-body coordinated motion is achieved stably and accurately while canceling the affect of the moments about the roll, pitch, and yaw axes applied on the robot body during an leg-moving operation.

Also, according to the motion controller and the motion control method in accordance with the third aspect of the present invention, the robot body substantially does not slip about the yaw axis since the motion is generated beforehand such that the yaw-axis moment at ZMP is substantially zero and accordingly the robot body is extremely unlikely to slip about the yaw axis. When the yaw-axis moment is applied on the robot, the motions about the pitch and roll axes are not generated by the motion for canceling the yaw-axis moment since the motions in the three planes of the pitch, roll, and yaw axes are solved at the same time.

In accordance with a fourth aspect of the present invention, a motion controller or a motion control method for a robot that comprises at least upper limbs, a trunk, and lower limbs and that performs a legged locomotion with the lower limbs comprises:

(A) means for or step of setting at least one of a foot motion, a trunk motion, an upper limb motion, and an attitude and a height of a waist for achieving a requested motion;

(B) means for or step of setting a ZMP trajectory based on the foot motion set by the (A) means or step;

(C) means for or step of calculating pitch-axis and roll-axis moments of the legged walking robot by using a low fidelity model of the legged walking robot, these moments being generated at the ZMP set by the (B) means or step by the foot motion, the trunk motion, and upper limb motion set by the (A) means or step;

(D) means for or step of computing an approximate solution for a waist motion for canceling the pitch-axis and roll-axis moments calculated by the (C) means or step;

(E) means for or step of calculating a yaw-axis moment of the legged walking robot by using the low fidelity model of the legged walking robot, the moment being given at the ZMP set by the (B) means or step by the approximate solution for the waist motion found by the (D) means or step;

(F) means for or step of computing an approximate solution for an upper limb motion for canceling the yaw-axis moment calculated by the (E) means or step;

(G) means for or step of calculating pitch-axis, roll-axis, and yaw-axis moments of the legged walking robot by using a high fidelity model of the legged walking robot, these moments being generated at the ZMP set by the (B) means or step during the whole-body motion calculated by the (D) means or step and the (F) means or step;

(H) means for or step of determining a solution for the whole-body motion when the pitch-axis, roll-axis, and yaw-axis moments calculated by the (G) means or step are smaller than respective predetermined allowable values; and (I) means for or step of modifying the moments at the preset ZMP based on the low fidelity model when the pitch-axis, roll-axis, and yaw-axis moments calculated by the (G) means or step are equal to or larger than the respective predetermined allowable values and for allowing the (D) means or step or the (F) means or step to use the modified moments.

According to the motion controller and the motion control method in accordance with the fourth aspect of the present invention, when a motion pattern of the robot body consisting of the combined motions of the upper limbs, the trunk, and the lower limbs is performed, the motions of the lower limbs and the trunk for canceling the pitch-axis moment and/or the roll-axis moment are calculated, and then the motion of the upper limbs for canceling the yaw-axis moment generated at the preset ZMP by the motions of the lower limbs and the trunk is calculated. With these calculations, a whole-body coordinated motion is achieved stably and accurately while canceling the affect of the moments about the roll, pitch, and yaw axes applied on the robot body during an leg-moving operation.

Also, according to the motion controller and the motion control method in accordance with the fourth aspect of the present invention, the robot body substantially does not slip about the yaw axis since the motion is generated beforehand such that the yaw-axis moment at ZMP is substantially zero and accordingly the robot body is extremely unlikely to slip about the yaw axis. When the yaw-axis moment is applied on the robot, the motions about the pitch and roll axes are not generated by the motion for canceling the yaw-axis moment since the motions in the three planes of the pitch, roll, and yaw axes are solved at the same time.

In the motion controller or the motion control method for the legged walking robot in accordance with the fourth aspect, the low fidelity model is preferably a linear and/or decoupling multi-mass-points model for the legged walking robot, and the high fidelity model is preferably a rigid body model or a non-linear and/or interferential multi-mass-points approximation model.

The motion controller or the motion control method for the legged walking robot in accordance with the fourth aspect may further comprise (F') means for or step of resetting and modifying the motion patterns of the trunk and the upper limbs when preset motions of the trunk and the upper limbs are not achieved by the approximate solutions found by the (D) means for or step of computing an approximate solution for a waist motion and/or by the (F) means for or step of computing an approximate solution for an upper limb motion.

The (D) means for or step of computing an approximate solution for the waist motion may compute an approximate solution for the waist motion by solving an equation of equilibrium of the moments at the preset ZMP generated by the foot motion, the trunk motion, and the upper limb motion and a moment at the preset ZMP generated by a horizontal waist motion.

Also, the (D) means for or step of computing an approximate solution for the waist motion may perform an operation by replacing a function of time with a function of frequency. More particularly, the (D) means for or step of computing an approximate solution for the waist motion may compute an approximate solution for the waist motion by calculating Fourier coefficients for a horizontal waist trajectory by applying Fourier series expansion for the moments at the preset ZMP generated by the foot motion, the trunk motion, and the upper limb motion and also by applying Fourier series expansion for a horizontal waist motion, and by applying inverse Fourier series expansion.

The (F) means for or step of computing an approximate solution for the upper limb motion may compute an approximate solution for the upper limb motion by solving an equation of equilibrium of the moments at the preset ZMP generated by the foot motion and the trunk motion.

Also, the (F) means for or step of computing an approximate solution for the upper limb motion may perform an operation by replacing a function of time with a function of frequency. More particularly, the (F) means for or step of computing an approximate solution for the upper limb motion may compute an approximate solution for the upper limb motion by calculating Fourier coefficients by applying Fourier series expansion for the moments at the preset ZMP generated by the foot motion and the trunk motion, and by applying inverse Fourier series expansion.

In accordance with a fifth aspect of the present invention, a robot apparatus comprises:

at least upper limbs, a trunk, and lower limbs with which the robot apparatus performs a legged locomotion;

means for setting a motion pattern of the robot;

means for calculating a yaw-axis moment of the robot body, the moment being generated at a preset ZMP by the set motion pattern;

means for calculating a motion pattern of the upper limbs for reducing the calculated yaw-axis moment; and means for modifying the set motion pattern in accordance with the calculated motion pattern of the upper limbs.

Here, the means for setting a motion pattern may set a motion pattern of at least any one of upper limbs, a trunk, and lower limbs of the robot.

When a biped walking robot performs a whole-body motion consisting of the combined motions of the upper limbs, the trunk, and the lower limbs, moments about the pitch, roll, and yaw axes are generated on the body of the robot.

According to the robot apparatus in accordance with the fifth aspect of the present invention, when a motion pattern of the robot body consisting of the combined motions of the upper limbs, the trunk, and the lower limbs is performed, the motion pattern is modified by calculating the upper limb motion for canceling the yaw-axis moment generated on the robot body at the preset ZMP. With this calculation, a whole-body coordinated motion is achieved stably and accurately while canceling the affect of the yaw-axis moment applied on the robot body during a leg-moving operation.

Especially in a biped walking robot, a yaw-axis moment applied on the robot body significantly increases as the walking speed of the robot increases. Although such a yaw-axis moment can be an obstacle by causing the robot body to turn, slip about the yaw-axis against the road surface, and fall down, this obstacle is suitably avoided in accordance with the fifth aspect.

Also, according to the robot apparatus in accordance with the fifth aspect of the present invention, the robot body substantially does not slip about the yaw axis since the motion is generated beforehand such that the yaw-axis moment at ZMP is substantially zero and accordingly the robot body is extremely unlikely to slip about the yaw axis.

Further objects, features, and advantages of the present invention will be apparent from the after-described detailed description of the embodiments and the accompanying drawings.

BRIEF DESCRIPTION OF THE DRAWINGS

FIG. 3 is a schematic illustration of a degrees-of-freedom configuration model that the legged walking robot 100 according to the embodiment is provided with.

FIGS. 7 and 8 are a flowchart of an exemplary procedure for generating the motions of a waist, a trunk, and lower limbs for stable walking of the legged walking robot 100.

FIGS. 9 and 10 are a flowchart of another exemplary procedure for generating the motions of a waist, a trunk, and lower limbs for stable walking of the legged walking robot 100.

BEST MODES FOR CARRYING OUT THE INVENTION

With reference to the accompanying drawings, embodiments of the present invention will be described.

Figure 1:
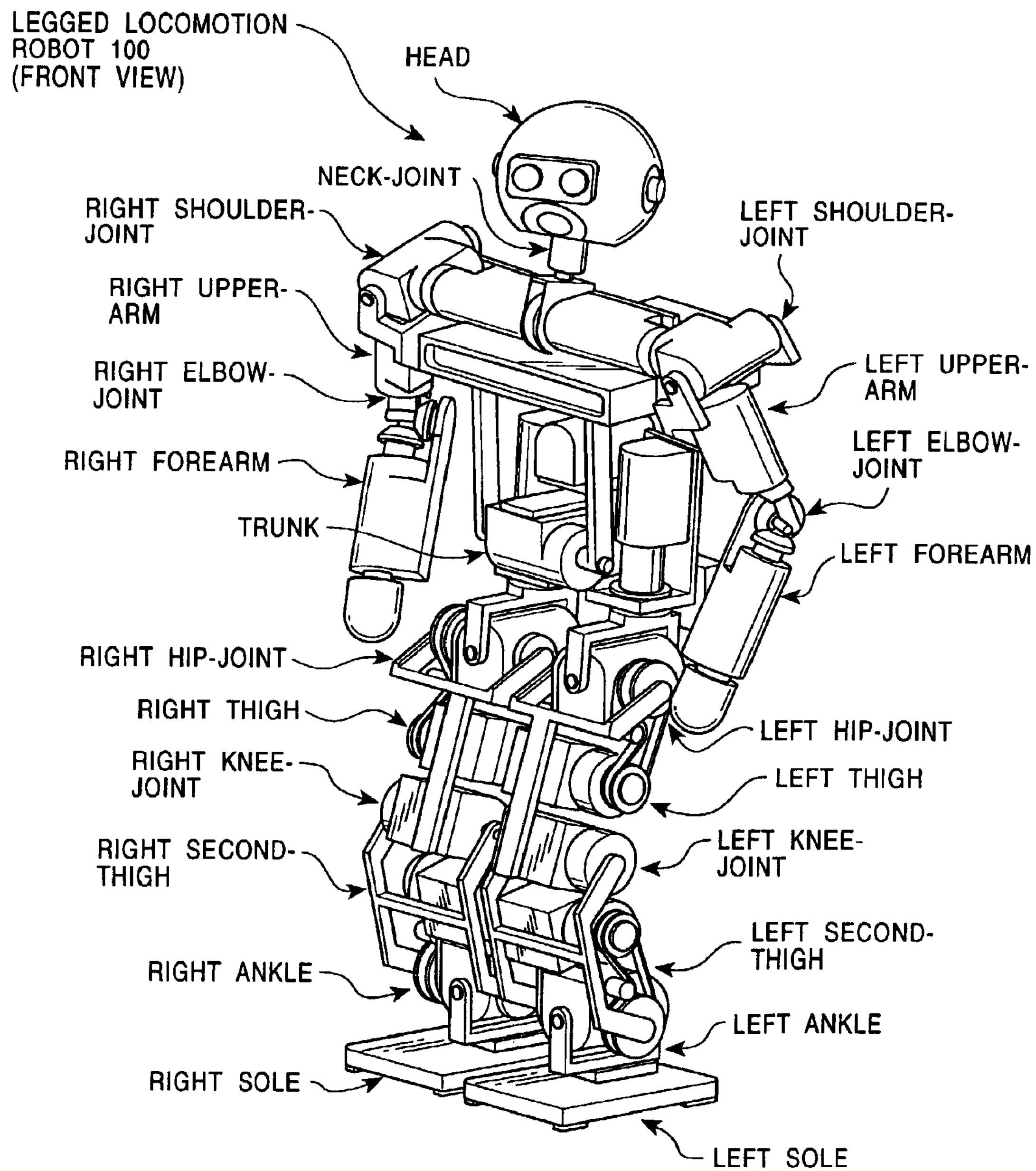
FIG. 1 is a perspective front view of a legged walking robot 100 according to an embodiment of the present invention.
Figure 2:
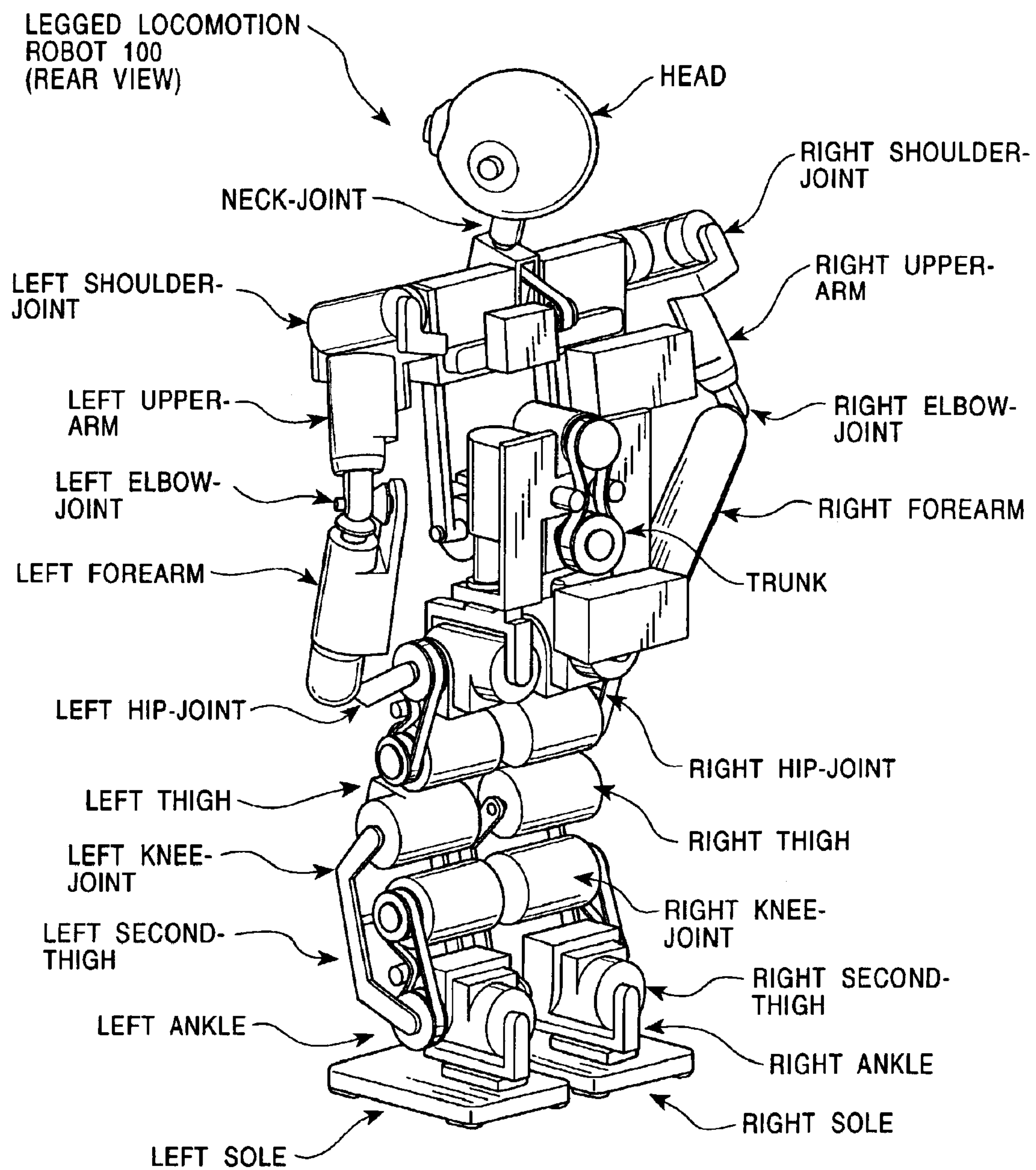
FIG. 2 is a perspective rear view of the legged walking robot 100 according to the embodiment of the present invention.
Figure 3:
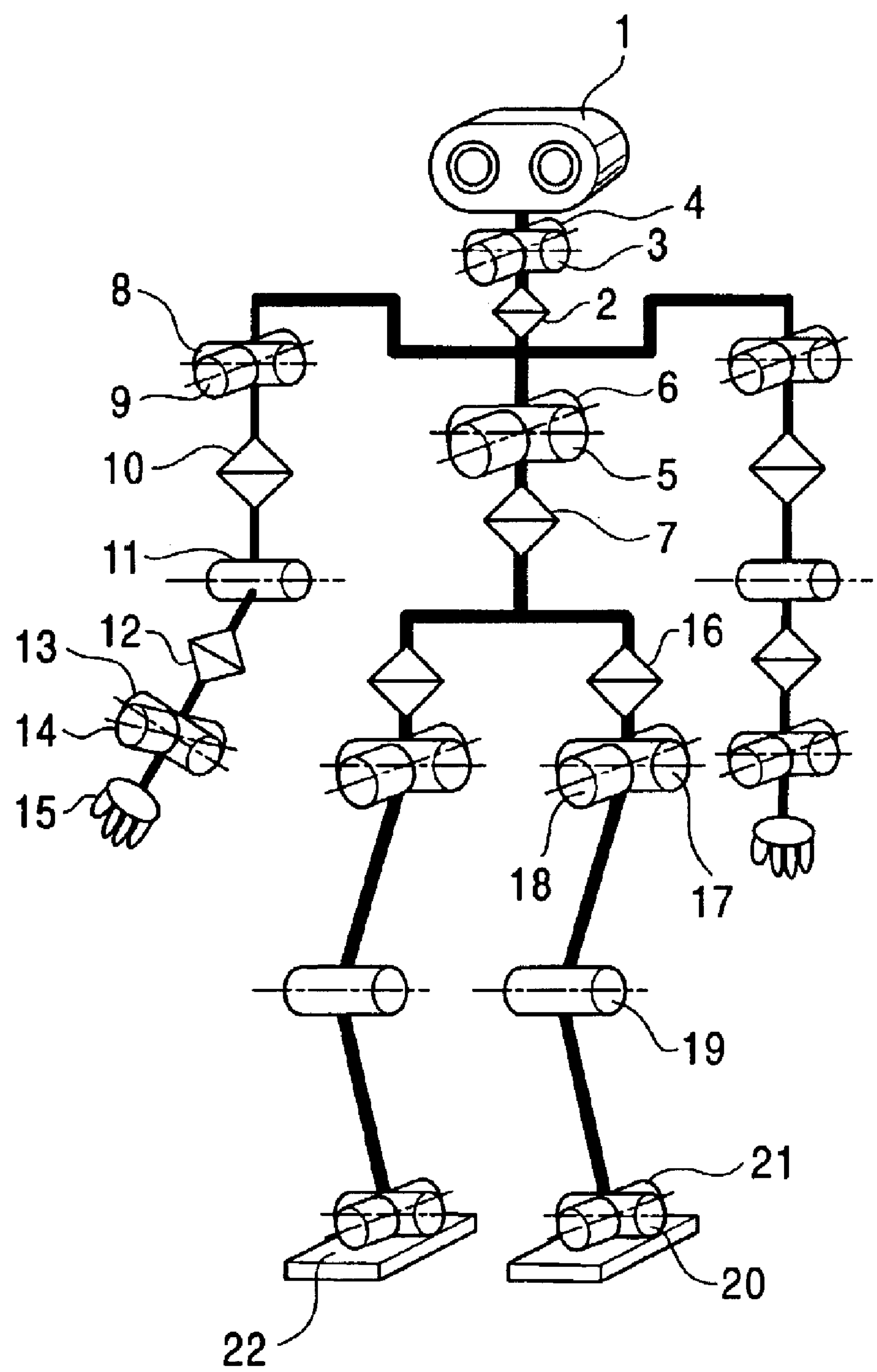

FIGS. 1 and 2 are respectively perspective front and rear views of a legged walking robot 100 according to an embodiment of the present invention. FIG. 3 is a schematic illustration of a multi-joints degrees-of-freedom configuration model that the legged walking robot 100 is provided with.

As shown in FIG. 3, the legged walking robot 100 has upper limbs including two arms and a head 1, lower limbs including two legs for achieving a locomotive motion, and a trunk connecting the upper limbs and the lower limbs.

A neck joint for supporting the head 1 has 3 degrees of freedom: i.e., a neck-joint yaw-axis 2, a neck-joint pitch-axis 3, and a neck-joint roll-axis 4.

Each arm has a shoulder-joint pitch-axis 8, a shoulder-joint roll-axis 9, an upper-arm yaw-axis 10, an elbow-joint pitch-axis 11, a forearm yaw-axis 12, a wrist-joint pitch-axis 13, a wrist-joint roll-axis 14, and a hand 15. In reality, the hand 15 has a multi-joints multi-degrees-of-freedom structure including a plurality of fingers. However, it is assumed in this specification that the hand 15 has zero degree of freedom since motions of the hands 15 have little affect on the attitude control and the walking control of the legged walking robot 100. That is to say, each arm has 7 degrees of freedom.

The trunk has 3 degrees of freedom: i.e., a trunk pitch-axis 5, a trunk roll-axis 6, and a trunk yaw-axis 7.

Each leg constituting the lower limbs has a hip-joint yaw-axis 16, a hip-joint pitch-axis 17, a hip-joint roll-axis 18, a knee-joint pitch-axis 19, an ankle-joint pitch-axis 20, an ankle-joint roll-axis 21, and a foot 22. In this specification, the cross point between the hip-joint pitch-axis 17 and the hip-joint roll-axis 18 defines a hip-point location of the legged walking robot 100 according to the embodiment. Although the human foot 22 actually has a structure including a bottom having multi-joints multi-degrees-of-freedom, it is assumed that the foot bottom of the legged walking robot 100 according to the embodiment has zero degree of freedom. That is to say, each leg has 6 degrees of freedom.

Thus, in summary, the legged walking robot 100 according to the embodiment has 32 (=3+7×2+3+6×2) degrees of freedom in total. However, the legged walking robot 100 applied for entertainment is not always limited to having 32 degrees of freedom. One skilled in the art will appreciate that the number of degrees of freedom or the number of joints can be changed properly in accordance with limitations on design and fabrication, requirement specifications and the like.

Each degree of freedom of the foregoing legged walking robot 100 is actually implemented by using an actuator. The preferably actuator is small and light in consideration of the requirements for assimilating it to the outer shape of a natural human body by eliminating an excessive projection thereof and for performing the attitude control of the unstable biped walking structure thereof. In the embodiment, a small AC servo actuator that is directly coupled to a gear and that houses a one-chip servo-system is mounted. Such an AC servo actuator is disclosed, for example, in Japanese Unexamined Patent Application Publication No. 2000-299970 (Specification in Japanese Patent Application H11-33386) which has already been assigned to the same assignee.

Figure 4:
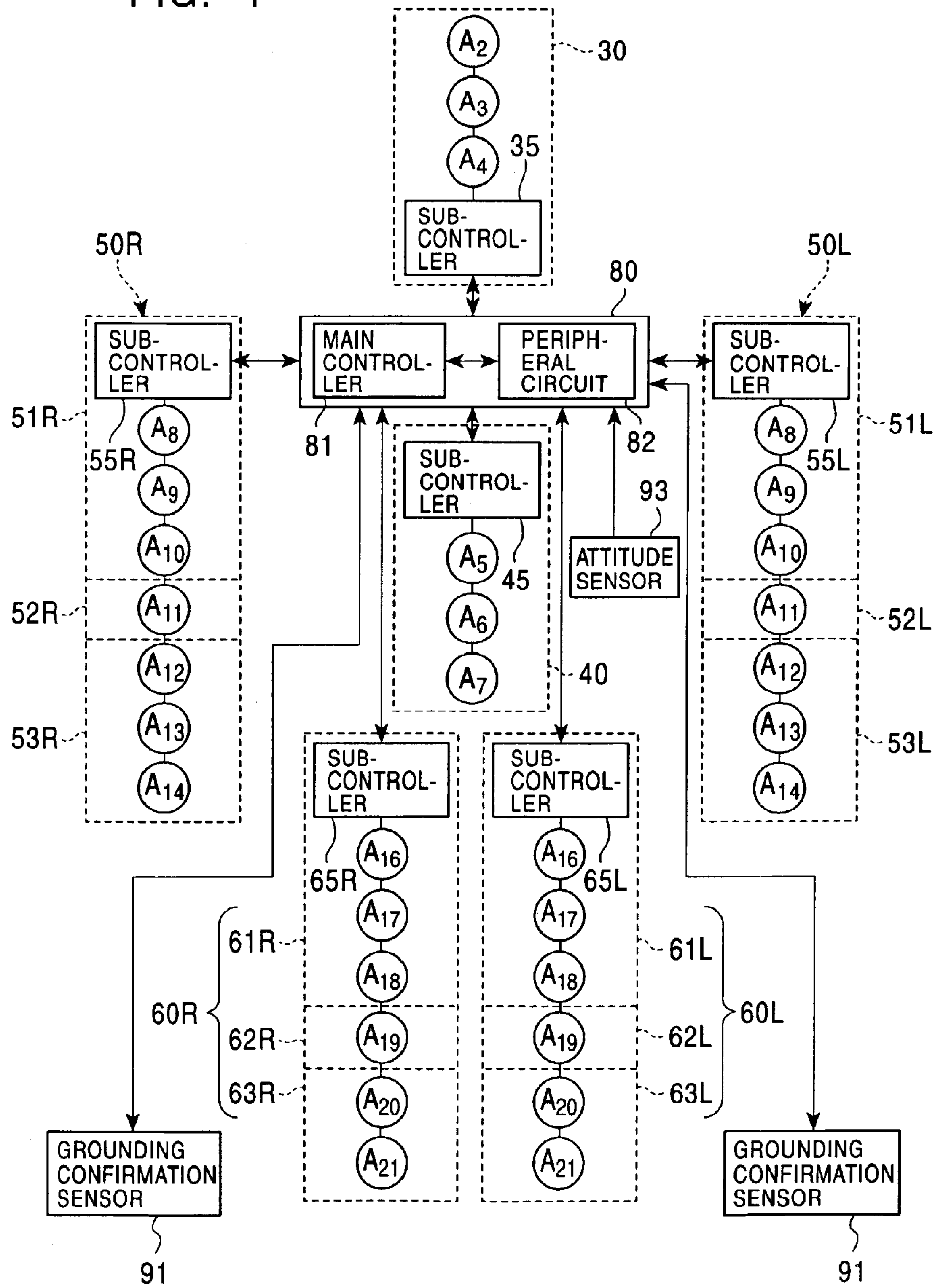
FIG. 4 is a schematic illustration of a control-system configuration model of the legged walking robot 100 according to the embodiment.

FIG. 4 is a schematic illustration of a control system configuration of the legged walking robot 100. As shown in the drawing, the legged walking robot 100 has mechanism units 30, 40, 50R/L, and 60R/L, each representing the corresponding one of four human limbs, and a control unit 80 performing an adaptive behavior control for achieving a coordinated motion among the mechanisms (hereinafter, postfixes R and L represent right and left, respectively).

The control unit 80 performs a centralized control over the overall motion of the legged walking robot 100. The control unit 80 has a main control unit 81 including main circuit components (not shown) such as a CPU (central processing unit) and a memory, and a periphery circuit 82 including an interface (not shown) for sending and receiving data and commands to and from a power supply circuit (not shown) and each component of the legged walking robot 100.

There is no limitation to an installation location of the control unit 80 in the way of achieving the present invention. Although mounted on the trunk unit 40 in FIG. 4, the control unit 80 may be mounted on the head unit 30. Alternatively, the control unit 80 may be installed out of the legged walking robot 100 and may communicate with the body of the legged walking robot 100 by a wire or wireless method.

The degree-of-freedom of each joint of the legged walking robot 100 shown in FIG. 3 is achieved by the corresponding actuator. In other words, the head unit 30 has a neck-joint yaw-axis actuator $A_2$, a neck-joint pitch-axis actuator $A_3$, and a neck-joint roll-axis actuator $A_4$ disposed therein for representing the neck-joint yaw-axis 2, the neck-joint pitch-axis 3, and the neck-joint roll-axis 4, respectively.

The trunk unit 40 has a trunk pitch-axis actuator $A_5$, a trunk roll-axis actuator $A_6$, and a trunk yaw-axis actuator $A_7$ disposed therein for representing the trunk pitch-axis 5, the trunk roll-axis 6, and the trunk yaw-axis 7, respectively.

The arm units 50R/L are broken down into upper-arm units 51R/L, elbow-joint units 52R/L, and forearm units 53R/L. Each of the arm units 50R/L has a shoulder-joint pitch-axis actuator $A_8$, a shoulder-joint roll-axis actuator $A_9$, an upper-arm yaw-axis actuator $A_{10}$, an elbow-joint pitch-axis actuator $A_{11}$, an elbow-joint roll-axis actuator $A_{12}$, a wrist-joint pitch-axis actuator $A_{13}$, and a wrist-joint roll-axis actuator $A_{14}$ disposed therein for representing the shoulder-joint pitch-axis 8, the shoulder-joint roll-axis 9, the upper-arm yaw-axis 10, the elbow-joint pitch-axis 11, an elbow-joint roll-axis 12, the wrist-joint pitch-axis 13, and the wrist-joint roll-axis 14, respectively.

The leg units 60R/L are broken down into thigh units 61R/L, knee units 62R/L, and second-thigh units 63R/L. Each of the leg units 60R/L has a hip-joint yaw-axis actuator $A_{16}$, a hip-joint pitch-axis actuator $A_{17}$, a hip-joint roll-axis actuator $A_{18}$, a knee-joint pitch-axis actuator $A_{19}$, an ankle-joint pitch-axis actuator $A_{20}$, and an ankle-joint roll-axis actuator $A_{21}$ disposed therein for representing the hip-joint yaw-axis 16, the hip-joint pitch-axis 17, the hip-joint roll-axis 18, the knee-joint pitch-axis 19, the ankle-joint pitch-axis 20, and the ankle-joint roll-axis 21, respectively.

Each of the actuators $A_2$, $A_3$ - - - used for the corresponding joint is preferably configured by the foregoing small AC servo actuator that is directly coupled to a gear and that houses a one-chip servo-system.

The head unit 30, the trunk unit 40, the arm units 50, and the leg units 60 have sub-controllers 35, 45, 55, and 65 for driving the corresponding actuators disposed therein. The trunk unit 40 has grounding detection sensors 91 and 92 for detecting the grounding of the foot bottoms of the legs 60R and 60L mounted thereon, respectively, and also is provided with an attitude sensor 93 for measuring the attitude thereof.

Each of the grounding detection sensors 91 and 92 is configured, for example, by a proximity sensor, a micro-switch, or the like placed on the foot bottom. The attitude sensor 93 is configured by a combination of, for example, an acceleration sensor and a gyro-sensor.

Outputs of the grounding detection sensors 91 and 92 are used to determine whether each of the right and left legs is in a standing state or in a swinging state during a motion such as walking and running. An output of the attitude sensor 93 is used to detect an inclination and an attitude of the trunk.

The main controller 80 dynamically modifies a control target in response to the outputs of the sensors 91 to 93. More particularly, the main controller 80 adaptively controls each of the sub-controllers 35, 45, 55, 65, thereby achieving a whole-body motion pattern driven in concert by the upper limbs, the trunk, and the lower limbs in concert of the legged walking robot 100.

To achieve the whole-body motion of the robot 100, a foot motion, a zero moment point (ZMP) trajectory, a trunk motion, an upper limb motion, a waist height, and so forth are set, and a command instructing a motion responsive to the above described setting is transmitted to each of the sub-controllers 35, 45, 55, and 65. Then, each of the sub-controllers 35, 45, 55, and 65 interprets the command received from the main controller 81 and outputs drive control signals to the corresponding actuators $A_2$, $A_3$ - - - . Here, "ZMP" means a point at which a moment caused by floor reaction forces during walking is zero, and "ZMP trajectory" means a trajectory of the moving ZMP, for example, while the legged walking robot 100 is walking as described above.

The following is an explanation of the procedure of an attitude stabilization process during a leg-moving operation, i.e., when performing the whole-body coordinated motion pattern consisting of the motions of feet, a waist, a trunk, lower limbs, and so forth of the legged walking robot 100 according to the embodiment.

Figure 5:
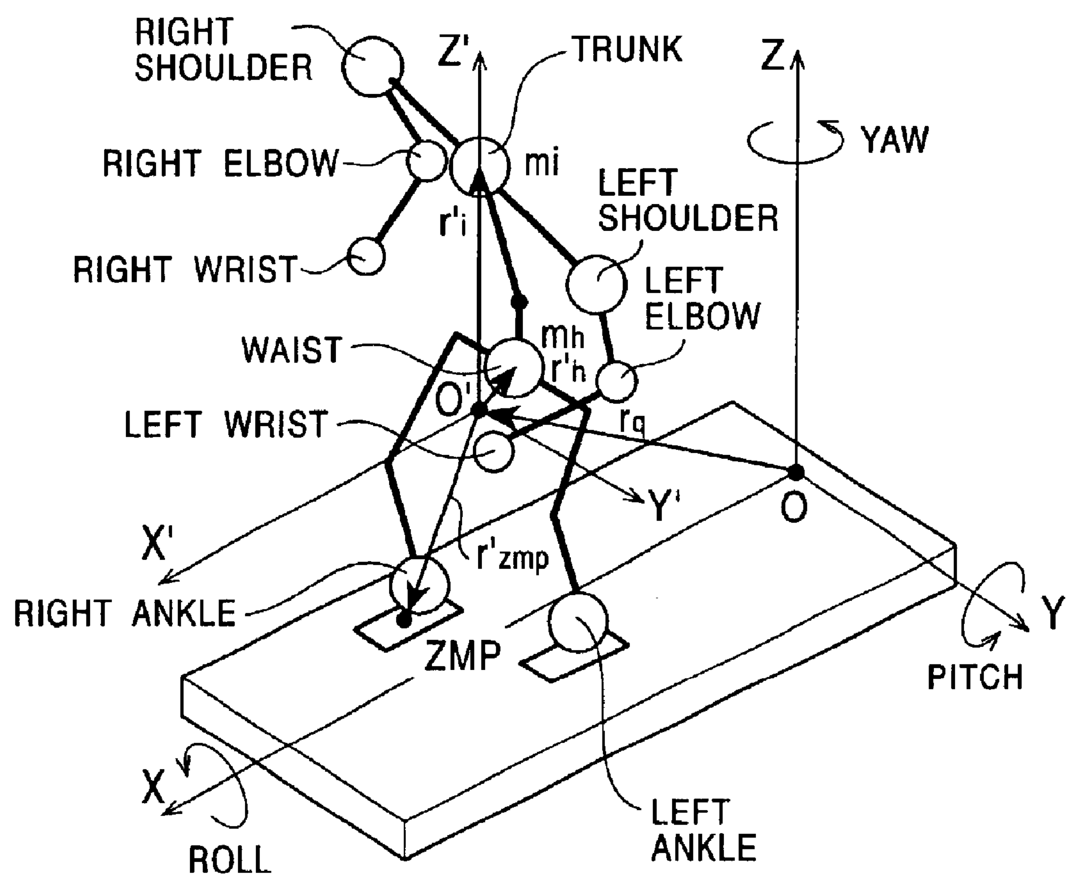
FIG. 5 is an illustration of a linear decoupling multi-mass-joints approximation model of the legged walking robot 100 introduced for calculating a walking control according to the embodiment.

The legged walking robot 100 according to the embodiment is an aggregate consisting of an infinite number of mass points, i.e., continuously connected mass points. However, a calculation amount for the stabilization process is reduced by replacing the aggregate with an approximation model consisting of a finite number of discrete masses. More particularly, the legged walking robot 100 physically having a multi-joints degrees-of-freedom configuration shown in FIG. 3 is replaced with a multi-mass-points approximation model as shown in FIG. 5. The approximation model shown in the drawing is a linear and decoupling multi-mass-points approximation model.

In FIG. 5, an O-XYZ coordinate system represents roll, pitch, and yaw axes in an absolute coordinate system, and an O'-X'Y'Z' coordinate system represents roll, pitch and yaw axes in a moving coordinate system moving together with the robot 100. In a multi-mass-points model shown in the drawing, i is a suffix representing an i-th mass point, $m_i$ is a mass of an i-th mass point, and $r'_i$ is an i-th point vector (in the moving coordinate system). A mass and a position vector of a waist mass-point, which is particularly essential for controlling the motion of a waist which will be described later, are represented by $m_h$ and $r'_h(r'_{hx}, r'_{hy}, r'_{hz})$, respectively, and a position vector of ZMP is represented by $r'_{zmp}(r'_{zmpx}, r'_{zmpy}, r'_{zmpz})$.

The multi-mass model, so to speak, represents a robot in a form of a wire-frame model. As viewed from FIG. 5, each of the shoulders, the elbows, the wrists, the trunk, the waist, and the ankles is presumed as a mass point in the multi-mass-points approximation model. In a multi-mass-points low-fidelity approximation model shown in the drawing, a moment equation is stated in a form of a linear equation, and the moment equation is decoupling with respect to a pitch axis and a roll axis. The multi-mass-points approximation model is generally generated by the following process:

(1) Estimating a mass distribution of the overall robot 100.

(2) Setting mass points. Setting of the mass points may be performed manually by a design engineer or may be automatically carried out in accordance with a predetermined rule;

(3) Acquiring the center of gravity of each region i, and imparting the center of gravity and the mass $m_i$ to the corresponding mass point;

(4) Denoting the mass $m_i$ as a sphere having a center at the mass point $r_i$ and a radius proportional to its mass; and (5) Connecting mass points or spheres to each other that are in an actual connection relationship.

Figure 6:
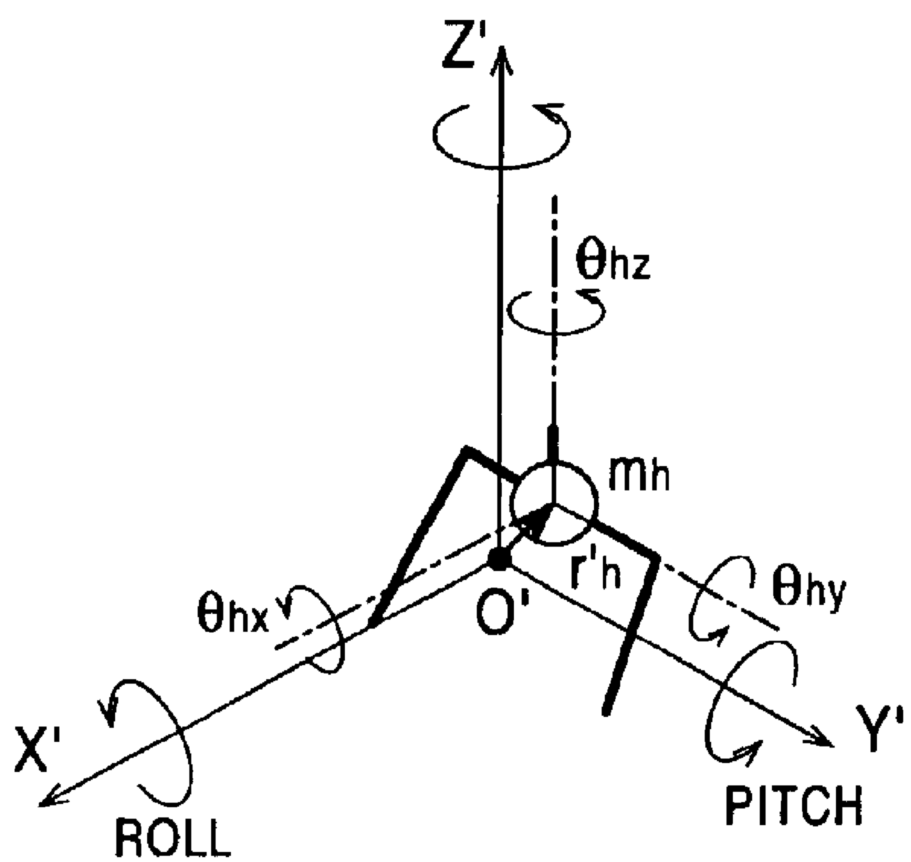
FIG. 6 is an enlarged view of a waist and its periphery of the multi-mass-points model shown in FIG. 5.

Rotation angles $(\theta_{hx}, \theta_{hy}, \theta_{hz})$ in the waist information of the multi-mass-points model shown in FIG. 5 define the attitude, that is, rotations about roll, pitch, and yaw axes, respectively, of the waist of the legged walking robot 100 (refer to FIG. 6 which is an enlarged illustration of the waist and its periphery of the multi-mass-points model).

The following is an explanation of the procedure of an attitude stabilization process, that is, a generation process of the whole-body coordinated motion pattern in which moments generated by motions of the waist, the trunk, and the lower limbs of the legged walking robot 100 according to the embodiment are canceled.

Figure 7:
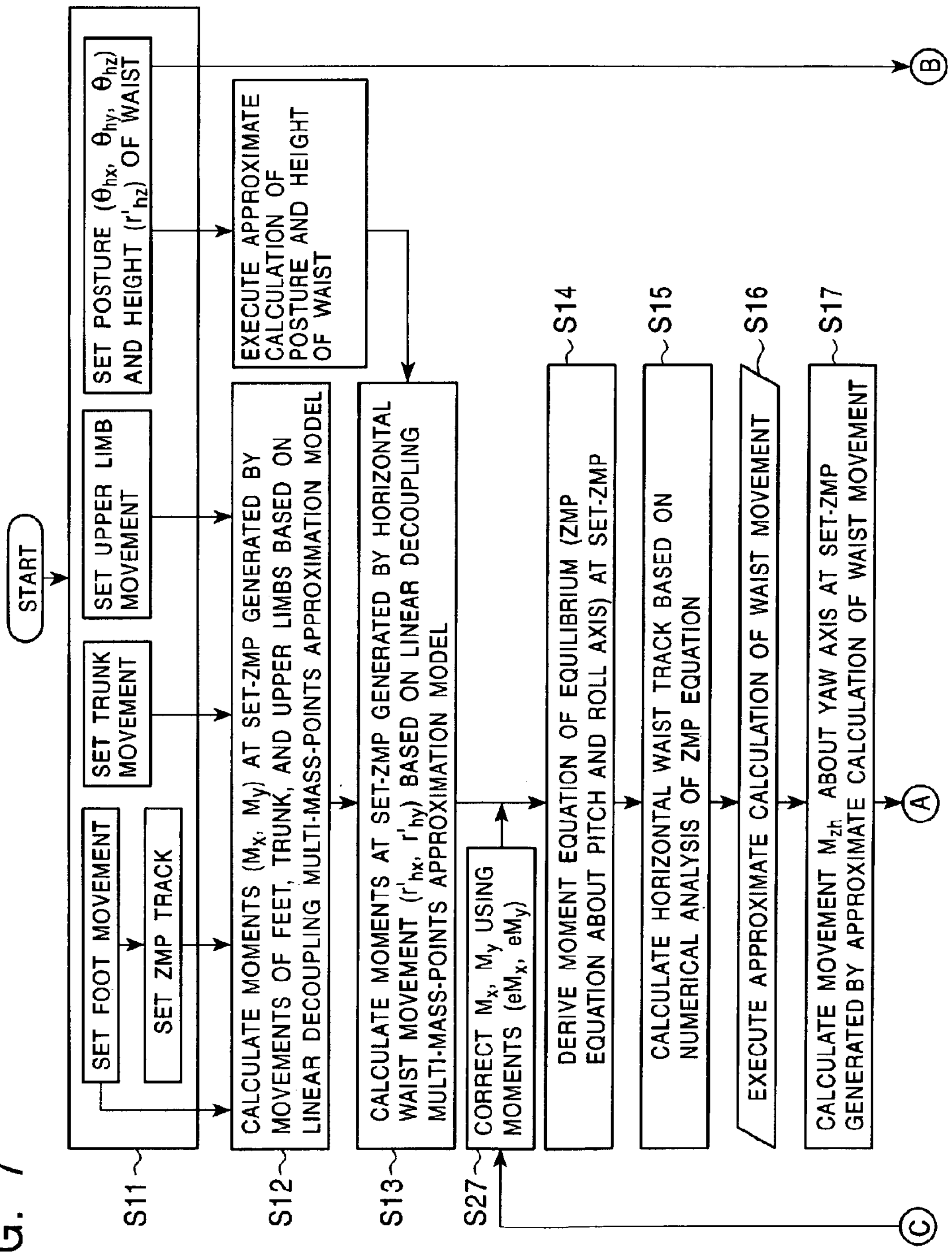

FIGS. 7 and 8 are a flowchart of an exemplary procedure for generating the motions of the waist, the trunk, and the lower limbs for stable walking of the legged walking robot 100. In the following explanation, a linear decoupling multi-mass-points approximation model shown in FIG. 5 is employed for describing the position and the motion of each joint of the legged walking robot 100. Also parameters shown below are used for calculation, where marks with an apostrophe (') should be understood as descriptive marks in the moving coordinate system.

$m_h$: a mass of the waist-mass-point $\vec{r}'_h(r'_{hx}, r'_{hy}, r'_{hz})$: a position vector of the waist-mass-point $m_i$: a mass of i-th mass point $\vec{r}'_i$: a position vector of i-th mass point $\vec{r}'_{zmp}$: a position vector of ZMP $\vec{g}(g_x, g_y, g_z)$: an acceleration vector of gravity O'-X'Y'Z': a moving coordinate system moving together with the robot O-XYZ: an absolute coordinate system In addition, there are provided preconditions in which the waist height of the legged walking robot 100 is constant ($r'_{hz}+r_{qz}$=constant), and the mass-point of the knee is zero.

First, patterns for actually determining an operation and a motion of each component such as a foot motion (more particularly, a foot bottom motion), a ZMP trajectory derived from the foot motion, a trunk motion, an upper limb motion, and an attitude and a height of the waist are set (Step S11). More particularly, first, the foot motion pattern is set, subsequently the ZMP trajectory and a pattern for the trunk motion are set, and then a pattern for the upper limb motion is set. In this stage, an unknown variable used for compensating for an after-mentioned yaw-axis moment with respect to the upper limb motion is set. With respect to the motion of the waist, a motion only in the Z' direction is set and moments in the X' and Y' directions are left unknown.

Then, a pitch-axis moment $M_y$ and a roll-axis moment $M_x$ at the preset ZMP generated by the motions of the feet, the trunk, and the upper limbs are calculated by using the linear decoupling multi-mass-points approximation model (Step S12).

Then, the pitch-axis moment $M_y$ and the roll-axis moment $M_x$ at the preset ZMP generated by the horizontal motion ($r'_{hx}$, $r'_{hy}$) of the waist are calculated by using the linear decoupling multi-mass-points approximation model (Step S13).

Then, an equation of equilibrium with respect to the pitch-axis and roll-axis moments at the preset ZMP in the O'-X'Y'Z' moving coordinate system moving together with the robot 100 (or with the multi-mass-points approximation model) is derived (Step S14). More particularly, a linear decoupling ZMP equation (1) shown below is derived by placing the pitch-axis moment $M_y$ and the roll-axis moment $M_x$ generated by the motions of the feet, the trunk, and the upper limbs at the right side of the equation as a known variable term, and by placing the term ($r'_{hx}$, $r'_{hy}$) at the left side of the equation as an unknown variable term.

$$+m_h H(\ddot{r}'_{hx}+\ddot{r}_{qx}+g_x)-m_h g_z(r'_{hx}-r'_{zmp_x})=-M_y(t)$$

$$-m_h H(\ddot{r}'_{hx}+\ddot{r}_{qx}+g_x)+m_h g_z(r'_{hx}-r'_{zmp_y})=-M_x(t) \quad (1)$$

where, the following are satisfied:

$\ddot{r}'_{hz}=0$ $r'_{hz}+r_{qz}=H(t)$

H(t)=constant with respect to time

Then, a horizontal trajectory of the waist is obtained by solving the above ZMP equation (Step S15). A numeric solution of the horizontal absolute location ($r'_{hx}$, $r'_{hy}$) as an unknown variable is found, for example, by solving the ZMP equation (1) by using a known numerical solving method such as the Euler method or the Runge-Kutta method (Step S16). The numerical solution obtained here is an approximate solution for the waist motion pattern for stable walking, and more particularly, a horizontal absolute location of the waist such that ZMP lies within a target location. The ZMP target location is usually set at the grounded foot bottom.

The approximate solution obtained here is an approximate solution of the horizontal absolute location ($r'_{hx}$, $r'_{hy}$) of the waist defining the waist motion pattern for stable walking, more particularly, a horizontal absolute location of the waist such that ZMP lies within a target location. While the pitch-axis moment $M_y$ and the roll-axis moment $M_x$ generated by the motions of the feet, the trunk, the upper limbs, the waist and so forth have been canceled, a moment $M_z$ about the yaw axis has not yet been canceled. Hence, the motion pattern for the upper limbs for canceling the moment $M_z$ about the yaw axis is generated in the following step.

In Step S17, a moment $M_{zh}$ about the yaw axis at the preset ZMP given by the approximate solution of the waist motion is calculated by using the following equation (2), where the moment $M_{zh}$ is generated at the waist about the yaw axis.

$$M_{zh}(t)=-m_h(\ddot{r}'_{hx}+r_{qx}+g_x)(r'_h-r'_{zmp_y})+\mathrm{i}\ m_h(\ddot{r}'_{hy}+\ddot{r}_{qy}+g_y)(r'_{hx}-r'_{zmp_x}) \quad (2)$$

Then, the moment $M_z$ about the yaw axis at the preset ZMP generated by the feet and the trunk motions is calculated by using the linear decoupling multi-mass-points approximation model (Step S18).

Then, an equation of equilibrium with respect to the moment $M_z$ about the yaw axis at the preset ZMP in the O'-X'Y'Z' moving coordinate system moving together with the robot 100 (or with the multi-mass-points approximation model) is derived (Step S19). More particularly, a linear decoupling ZMP equation (3) shown below is derived by placing the moment $M_z$ about the yaw axis generated by the motions of the feet and the trunk and the moment $M_{zh}$ about the yaw axis given by the approximate solution of the motion of the waist at the right side of the equation as a known variable term, and by placing a moment $M_{arm}$ about the yaw axis generated by the motions of the upper limb points at the left side of the equation as an unknown variable term.

$$M_{arm}(\theta_{arm}, t)=-M_{zh}(t)-Mz_h(t) \quad (3)$$

Furthermore, the ZMP equation (3) is solved by using the known numerical solving method such as the Euler method or the Runge-Kutta method (Step S20), and a motion pattern for the upper limbs necessary for stable walking by compensating for the moments $M_z$ and $M_{zh}$ about the yaw axis is calculated (Step S21). A given unknown variable for compensating for the yaw-axis moment is applied for calculating the motion pattern for the upper limbs with the numerical solving method.

In equation (3), any joint angle of the upper limb joints may be used as an unknown variable θ. More particularly, the above equation (3) may be satisfied with a combination of at least one joint of the shoulder joint pitch axis 8, the shoulder joint roll axis 9, the upper-arm yaw-axis 10, the elbow joint pitch axis 11, the forearm yaw axis 12, the wrist joint pitch axis 13, and the wrist joint roll axis 14 among the joint degrees-of-freedom shown in FIG. 3.

Actuating the right and left upper limbs in a symmetric or an anti-phase mode is not a precondition for satisfying the above equation (3). With respect to choosing an unknown variable θ, a joint angle ($\theta_{arm\_shoulder}$) about the pitch axis of the shoulder joint may be used as an unknown variable with which generation of a large moment is expected.

Alternatively, by using the joint angle ($\theta_{arm\_shoulder}$) about the pitch axis of the shoulder joint, which is expected to generate a moment for a motion similar to the human body mechanism, as an unknown variable and also by defining an elbow-joint angle ($\theta_{arm\_elbow}$) as ($\theta_{arm\_elbow=G\times\theta arm\_ahoulder}$; where, G is a gain), a pattern of the yaw-axis compensation motion generated by the coordinated motion of the shoulder joint and the elbow joint is calculated while the number of unknown variables remains a single (i.e., the amount of calculation remains unchanged).

It is of course theoretically possible to satisfy the above equation (3) by using the trunk yaw axis 7 as a part of the upper body of the legged walking robot 100, however, the robot body more easily satisfies the above equation (3) by using an operation of the upper limbs such as the shoulder joints and the elbow joints which have a wider moveable angle, accordingly making it possible to achieve a higher accurate control.

The motion patterns for the trunk and the upper limbs are reset and modified when preset trunk and upper limb motions are not achieved by the approximate solution obtained up to Step S21 (Step S22). A knee trajectory may be calculated in this stage.

Then, moments ($eM_x$, $eM_y$, $eM_z$) about roll, pitch, and yaw axes at the preset ZMP in the high fidelity model (i.e., an strict model of the legged walking robot 100 having a rigid body or an extremely large number of mass points) are calculated by substituting the whole-body motion pattern obtained as described above (Step S23). Although satisfying the above [Mathematical Expression 3] is a precondition in the low fidelity model, such a precondition is not required in the high fidelity model (i.e., being constant with respect to a change in time is not required).

The moments $\epsilon(eM_x, eM_y, eM_z)$ in the high fidelity model are moment errors generated in the waist motion about the roll, pitch, and yaw axes, respectively. Determination on if these moments $\epsilon(eM_x, eM_y, eM_z)$ about the corresponding axes are smaller than allowable values ($\epsilon M_x$, $\epsilon M_y$, $\epsilon M_z$) is executed in the following Step S24. Since being smaller than the allowable values $\epsilon$ means that a strict solution for the stable motion patterns for the waist, the trunk, and the lower limbs of the legged walking robot 100, and also the whole-body motion pattern in which the moments $M_z$ and $M_{zh}$ about the yaw axis of the waist of the robot are obtained (Step S25), the routine of the whole process ends.

On the other hand, if the moments ($\epsilon M_x$, $\epsilon M_y$, $\epsilon M_z$) in the high fidelity model are equal to or larger than the allowable values ($\epsilon M_x$, $\epsilon M_y$, $\epsilon M_z$), the moments ($M_x$, $M_y$) about the corresponding roll and pitch axes in the approximation model are modified by using the moments ($eM_x$, $eM_y$) about the corresponding roll and pitch axes in the high fidelity model (Step S27), and the ZMP equation is derived again. Alternatively, the generated moment $M_z$ about the yaw axis in the approximation model is modified by using the generated moments $eM_z$ about the yaw axis in the high fidelity model (Step S26), and the ZMP equation is derived again. Thus, by repeating the foregoing calculation and modification of the approximate solution for the motion patterns for the waist, the trunk, and the lower limbs until becoming smaller than the allowable value $\epsilon$, the strict solution for the motion patterns for the waist and the lower limbs and the whole-body motion pattern for stable walking are obtained.

In other words, according to the process routine shown in FIGS. 7 and 8, the whole-body motion pattern for the legged walking robot for stably and accurately driving the robot body is generated while canceling the affect of the roll-axis, pitch-axis, and yaw-axis moments applied during the legmoving operation. Also, the mutually interfering motions about roll, pitch, and yaw axes are calculated effectively.

Also, according to the process routine shown in FIGS. 7 and 8, the robot body substantially does not slip about the yaw axis since the motion is generated beforehand such that the yaw-axis moment at ZMP is substantially zero and accordingly the robot body is extremely unlikely to slip about the yaw axis. Especially, this is an essential technology for an entertainment robot that puts an emphasis on its own motion. When a yaw-axis moment is applied on the robot, the motions about the pitch and roll axes are also not generated by the motion for canceling the yaw-axis moment since the motions in the three planes of the pitch, roll, and yaw axes are solved at the same time.

Furthermore, in the process routine shown in FIGS. 7 and 8, the upper limb motion for compensating for the yaw-axis moment obtained in Step S21 is achieved by the motion simulating swings of human arms and a rotation of a human hip. Such an upper limb motion contributes to maintaining attitude stability to a large extent, especially at the time of a high speed walking motion, and also to a well-produced performance, for example, a demonstration of the motion of the upper half of the robot body with a rich expression.

From the viewpoint of "power of expression" for a motion of a human and an ape, the motion and attitude of the upper body such as the arms and torso are extremely significant not only for achieving an operation but also for expressing an emotion. This is why "body gesture" and "hand waving" are so called. Therefore, compensating for the yaw-axis moment by utilizing the motion led by the upper half body such as a body gesture and hand waving allows the robot body to have a rich power of dynamic expression, and thereby is especially preferable to an entertainment-oriented robot.

Figure 9:
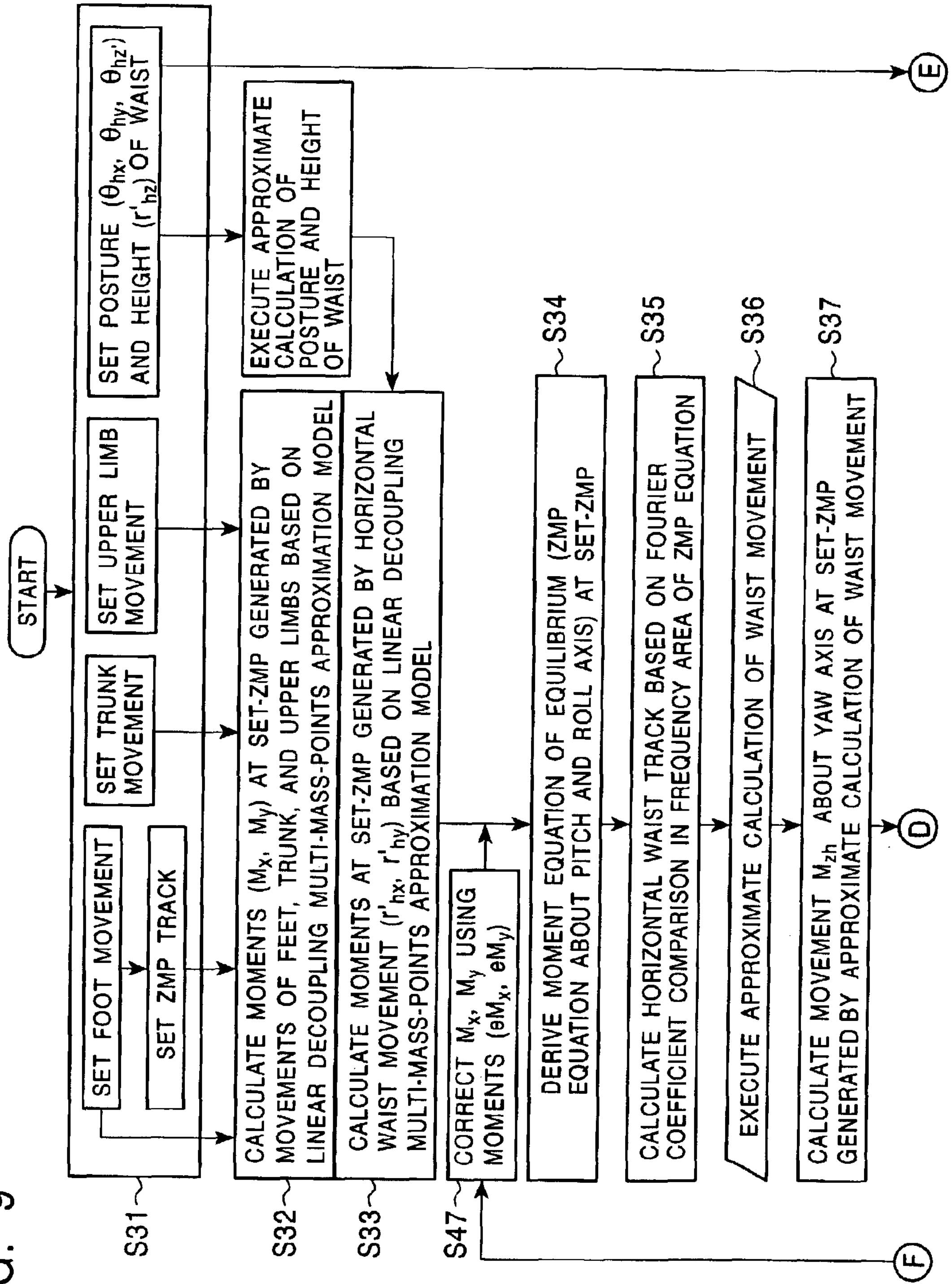
Figure 11:
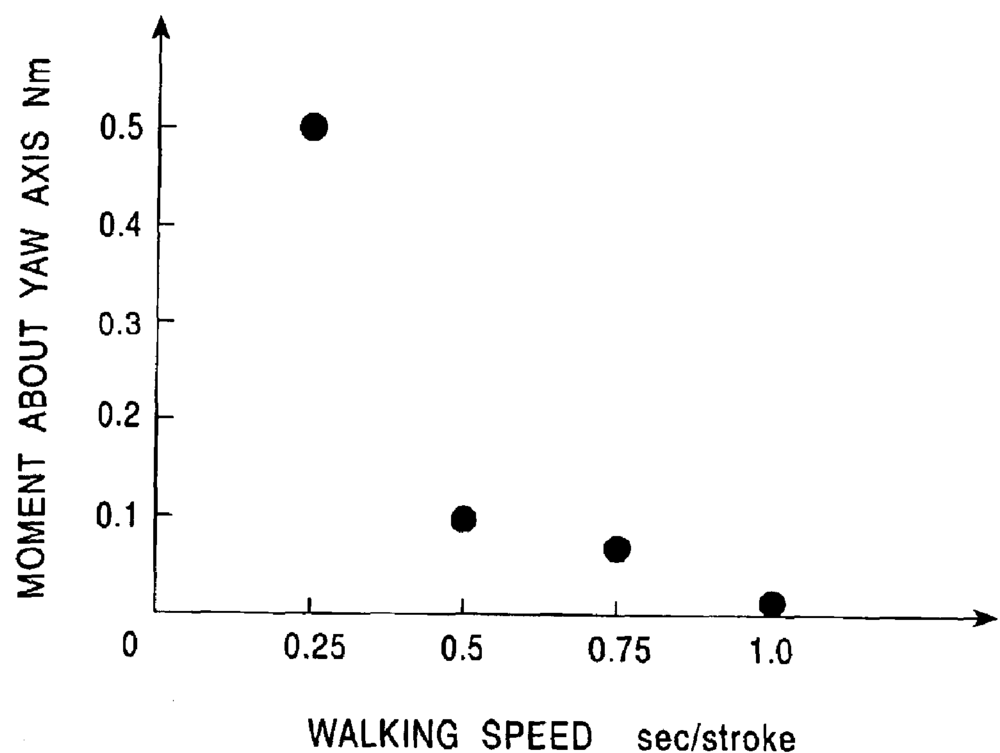
FIG. 11 is an exemplary diagram of the relationship between a yaw-axis moment [Nm] and a walking speed [s/step] of a biped walking robot.

FIGS. 9 and 10 are a flowchart of an exemplary procedure for generating the motions of the waist, the trunk, and the lower limbs for stable walking of the legged walking robot 100. Similarly to the above description, a linear decoupling multi-mass-points approximation model shown in FIG. 5 is employed for describing the position and the motion of each joint of the legged walking robot 100.

First, patterns for actually determining an operation and a motion of each component such as a foot motion (more particularly, a foot bottom motion), a ZMP trajectory derived from the foot motion, a trunk motion, an upper limb motion, and an attitude and a height of the waist are set (Step S31). More particularly, first, the foot motion pattern is set, subsequently the ZMP trajectory and a pattern for the trunk motion are set, and then a pattern for the upper limb motion is set. In this stage, an unknown variable used for compensating for an after-mentioned yaw-axis moment with respect to the upper limb motion is set. With respect to the motion of the waist, a motion only in the Z' direction is set and moments in the X' and Y' directions are left unknown.

Then, a moment $M_y$ about the pitch axis and a moment $M_x$ about the roll axis at the preset ZMP generated by the motions of the feet, the trunk, and the upper limbs are calculated by using the linear decoupling multi-mass-points approximation model (Step S32).

Then, a pitch-axis moment $M_y$ and a roll-axis moment $M_x$ at the preset ZMP generated by the horizontal motion ($r'_{hx}$, $r'_{hy}$) of the waist are calculated by using the linear decoupling multi-mass-points approximation model (Step S33).

Then, an equation of equilibrium with respect to the pitch-axis and roll-axis moments at the preset ZMP in the O'-X'Y'Z' moving coordinate system moving together with the robot 100 (or with the multi-mass-points approximation model) is derived (Step S34). More particularly, a linear decoupling ZMP equation (1) is derived by placing the pitch-axis moment $M_y$ and the roll-axis moment $M_x$ generated by the motions of the feet, the trunk, and the upper limbs at the right side of the equation as a known variable term, and by placing the term ($r'_{hx}$, $r'_{hy}$) at the left side of the equation as an unknown variable term (in the same step).

Next, Fourier series expansion with respect to the horizontal waist motion ($r'_{hx}$, $r'_{hy}$) is executed, then each Fourier series expansion with respect to the pitch-axis moment $M_y$ and the roll-axis moment $M_x$ at the preset ZMP is executed, subsequently Fourier coefficients with respect to the horizontal waist trajectory are calculated, and then inverse Fourier series expansion is executed (Step S35), resulting in an approximate solution for the waist motion (Step S36).

As is known by one skilled in the art, Fourier series expansion allows time-base components to be replaced with frequency components for calculation. That is to say, the motion of the waist can be treated as a periodic motion in this case. In addition, applying FFT (fast Fourier transformation) substantially increases the calculation speed.

The approximate solution obtained here is an approximate solution of the horizontal absolute location ($r'_{hx}$, $r'_{hy}$) of the waist defining the waist motion pattern for stable walking, more particularly, a horizontal absolute location of the waist such that ZMP lies within a target location. While the pitch-axis moment $M_y$ and the roll-axis moment $M_x$ generated by the motions of the feet, the trunk, the upper limbs, the waist and so forth have been canceled, a moment $M_z$ about the yaw axis has not yet been canceled. Hence, the motion pattern for the upper limbs for canceling the moment $M_z$ and $M_{zh}$ about the yaw axis is generated in the following step.

In Step S17, a moment $M_{zh}$ about the yaw axis at the preset ZMP given by the approximate solution of the waist motion is calculated by using the above equation (2), where the moment $M_{zh}$ is generated at the waist about the yaw axis.

Then, the moment $M_z$ about the yaw axis at the preset ZMP generated by the motions of the feet and the trunk is calculated by using the linear decoupling multi-mass-points approximation model (Step S38).

Then, an equation of equilibrium with respect to the moment about the yaw axis at the preset ZMP in the O'-X'Y'Z' moving coordinate system moving together with the robot 100 (or with the multi-mass-points approximation model) is derived (Step S39). More particularly, a linear decoupling ZMP equation (3) shown below is derived by placing the moment $M_z$ about the yaw axis generated by the motions of the feet and the trunk and the moment $M_{zh}$ about the yaw axis given by the approximate solution of the motion of the waist at the right side of the equation as a known variable term, and by placing a moment $M_{arm}$ about the yaw axis generated by the motions of the upper limb points at the left side of the equation as an unknown variable term.

Next, the upper limb motion pattern is calculated (Step S41) based on the Fourier coefficient comparison method in the frequency region of the ZMP equation (Step S40). A given unknown variable used for compensating for the yaw-axis moment is applied for calculating the upper limb pattern.

In equation (3), any joint angle of the upper limb joints may be used as an unknown variable $\theta$. More particularly, the above equation (3) may be satisfied with a combination of at least one joint of the shoulder joint pitch axis 8, the shoulder joint roll axis 9, the upper-arm yaw-axis 10, the elbow joint pitch axis 11, the forearm yaw axis 12, the wrist joint pitch axis 13, and the wrist joint roll axis 14 among the joint degrees-of-freedom shown in FIG. 3.

Actuating the right and left upper limbs in a symmetric or an anti-phase mode is not a precondition for satisfying the above equation (3). With respect to choosing an unknown variable $\theta$, a joint angle ($\theta_{arm\_shoulder}$) about the pitch axis of the shoulder joint may be used as an unknown variable with which generation of a large moment is expected. Alternatively, by using the joint angle ($\theta_{arm\_shoulder}$) about the pitch axis of the shoulder joint, which is expected to generate a moment for a motion similar to the human body mechanism, as an unknown variable and also by defining an elbow-joint angle ($\theta_{arm\_elbow}$) as ($\theta_{arm\_elbow}=G\times\theta_{arm\_ahoulder}$; where, G is a gain), a pattern of the yaw-axis compensation motion generated by the coordinated motion of the shoulder joint and the elbow joint is calculated while the number of unknown variables remains a single (i.e., the amount of calculation remains unchanged).

It is of course theoretically possible to satisfy the above equation (3) by using the trunk yaw axis 7 as a part of the upper body of the legged walking robot 100, however, the robot body more easily satisfies the above equation (3) by using an operation of the upper limbs such as the shoulder joints and the elbow joints which have a wider moveable angle, accordingly making it possible to achieve a higher accurate control.

The motion patterns for the trunk and the upper limbs are reset and modified when preset trunk and upper limb motions are not achieved by the approximate solution obtained up to Step S21 (Step S42). A knee trajectory may be calculated in this stage.

Then, moments ($eM_x$, $eM_y$, $eM_z$) about roll, pitch, and yaw axes at the preset ZMP in the high fidelity model (i.e., an strict model of the legged walking robot 100 having a rigid body or an extremely large number of mass points) are calculated by substituting the whole-body motion pattern obtained as described above (Step S43). Although satisfying the above [Mathematical Expression 3] is a precondition in the low fidelity model, such a precondition is not required in the high fidelity model (i.e., being constant with respect to a time change is not required).

The moments ($eM_x$, $eM_y$, $eM_z$) in the high fidelity model are moment errors generated in the waist motion about the roll, pitch, and yaw axes, respectively. Determination on if these moments ($eM_x$, $eM_y$, $eM_z$) about the corresponding axes are smaller than allowable values ($\epsilon M_x$, $\epsilon M_y$, $\epsilon M_z$) is executed in the following Step S44. Since being smaller than the allowable values $\epsilon$ means that a strict solution for the stable motion patterns for the waist, the trunk, and the lower limbs of the legged walking robot 100, and also the whole-body motion pattern in which the moments $M_z$ and $M_{zh}$ about the yaw axis of the waist of the robot are obtained (Step S45), the routine of the whole process ends.

On the other hand, if the moments ($eM_x$, $eM_y$, $eM_z$) in the high fidelity model are equal to or larger than the allowable values ($\epsilon M_x$, $\epsilon M_y$, $\epsilon M_z$), the moments ($M_x$, $M_y$) about the corresponding roll and pitch axes in the approximation model are modified by using the moments ($eM_x$, $eM_y$) about the corresponding roll and pitch axes in the high fidelity model (Step S47), and the ZMP equation is derived again. Alternatively, the generated moment $M_z$ about the yaw axis in the approximation model is modified by using the generated moments $eM_z$ about the yaw axis in the high fidelity model (Step S46), and the ZMP equation is derived again. Thus, by repeating the foregoing calculation and modification of the approximate solution for the motion patterns for the waist, the trunk, and the lower limbs until becoming smaller than the allowable value $\epsilon$, the strict solution for the motion patterns for the waist and the lower limbs and the whole-body motion pattern for stable walking are obtained.

In other words, according to the process routine shown in FIGS. 9 and 10, the whole-body motion pattern for the legged walking robot for stably and accurately driving the robot body is generated while canceling the affect of the roll-axis, pitch-axis, and yaw-axis moments applied during the leg-moving operation. Also, the mutually interfering motions about roll, pitch, and yaw axes are calculated effectively.

Also, according to the process routine shown in FIGS. 9 and 10, the robot body substantially does not slip about the yaw axis since the motion is generated beforehand such that the yaw-axis moment at ZMP is substantially zero and accordingly the robot body is extremely unlikely to slip about the yaw axis. Especially, this is an essential technology for an entertainment robot that puts an emphasis on its own motion. When a yaw-axis moment is applied on the robot, the motions about the pitch and roll axes are also not generated by the motion for canceling the yaw-axis moment since the motions in the three planes of the pitch, roll, and yaw axes are solved at the same time.

Furthermore, in the process routine shown in FIGS. 9 and 10, the upper limb motion for compensating for the yaw-axis moment obtained in Step S41 is achieved by the motion simulating swings of human arms and a rotation of a human hip. Such an upper limb motion contributes to maintaining attitude stability to a large extent, especially at the time of a high speed walking motion, and also to a well-produced performance, for example, a demonstration of the motion of the upper half of the robot body with a rich expression.

From the viewpoint of "power of expression" for a motion of a human and an ape, the motion and attitude of the upper body such as the arms and torso are extremely significant not only for achieving an operation but also for expressing an emotion. This is why "body gesture" and "hand waving" are so called. Therefore, compensating for the yaw-axis moment by utilizing the motion led by the upper half body such as a body gesture and hand waving allows the robot body to have a rich power of dynamic expression, and thereby is especially preferable to an entertainment-oriented robot.

Appendix

While the present invention has been described in detail referring to the specific embodiments, it is evident that one skilled in the art will make modifications and alternatives of the embodiments without departing from the scope of the sprit of the present invention.

Also, the spirit of the present invention is not always limited to a product called "robot". That is, the present invention is applicable to products in other industrial fields such as a toy as long as they are mechanical apparatuses that perform motions similar to human motions by utilizing an electric or magnetic effect.

After all, the present invention should not be interpreted in a limited manner since it is disclosed in an exemplary form. The claims stated at the beginning for understanding the spirit of the present invention should be viewed.

INDUSTRIAL APPLICABILITY

According to the present invention, an excellent motion controller, an excellent motion control method, which are used for a legged walking robot and which stably and accurately achieve an leg-moving operation such as high-speed walking, and also a robot apparatus are provided.

Furthermore, according to the present invention, an excellent motion controller, an excellent motion control method, which are used for a legged walking robot that reduces a moment applied about the yaw axis of the robot body by using a motion of the upper limbs of the robot, and also a robot apparatus are provided.

What is claimed is:

1. A motion controller for a robot that comprises at least upper limbs, a trunk, and lower limbs and that performs a legged locomotion with the lower limbs, the controller comprising:

means for setting motions of at least one of the upper limbs, the trunk, and the lower limbs;

means for calculating a pitch-axis moment and/or a roll-axis moment of the body of the legged walking robot, these moments being generated at a preset ZMP by the set motions of the upper limbs, the trunk, and the lower limbs;

means for calculating motions of the lower limbs and the trunk for canceling the pitch-axis moment and/or the roll-axis moment;

means for calculating a yaw-axis moment of the body of the legged walking robot, the moment being generated at the preset ZMP by the calculated motions of the lower limbs and the trunk;

means for calculating a motion of the upper limbs for canceling the yaw-axis moment; and means for modifying the set motions of the upper limbs, the trunk, and the lower limbs in accordance with the calculated motions of the upper limbs, the trunk, and the lower limbs.

2. The motion controller for the legged walking robot according to claim 1, wherein each of the upper limbs comprises a shoulder joint and an elbow joint, each having at least one rotational degree of freedom, and the motion of the upper limbs for canceling the yaw-axis moment is a motion generated by driving the shoulder joints and/or the elbow joints.

3. A motion controller for a robot that comprises at least upper limbs, a trunk, and lower limbs and that performs a legged locomotion with the lower limbs, the controller comprising:

(a) means for setting at least one of a foot motion, a trunk motion, an upper limb motion, and an attitude and a height of a waist for achieving a requested motion;

(b) means for setting a ZMP trajectory based on the foot motion set by the (a) means;

(c) means for calculating pitch-axis and roll-axis moments of the legged walking robot, these moments being generated at the ZMP set by the (b) means by the foot motion, the trunk motion, and the upper limb motion set by the (a) means;

(d) means for computing a solution for a waist motion for canceling the pitch-axis and roll-axis moments calculated by the (c) means;

(e) means for calculating a yaw-axis moment of the legged walking robot, the moment being generated at the ZMP set by the (b) means by the waist motion solved by the (d) means;

(f) means for computing a solution for an upper limb motion for canceling the yaw-axis moment calculated by the (e) means; and (g) means for deriving a whole-body motion of the legged walking robot based on the waist motion and the upper limb motion solved by the (d) means and the (f) means, respectively.

4. A motion controller for a robot that comprises at least upper limbs, a trunk, and lower limbs and that performs a legged locomotion with the lower limbs, the controller comprising:

(A) means for setting at least one of a foot motion, a trunk motion, an upper limb motion, and an attitude and a height of a waist for achieving a requested motion;

(B) means for setting a ZMP trajectory based on the foot motion set by the (A) means;

(C) means for calculating pitch-axis and roll-axis moments of the legged walking robot by using a low fidelity model of the legged walking robot, these moments being generated at the ZMP set by the (B) means by the foot motion, the trunk motion, and upper limb motion set by the (A) means;

(D) means for computing an approximate solution for a waist motion for canceling the pitch-axis and roll-axis moments calculated by the (C) means;

(E) means for calculating a yaw-axis moment of the legged walking robot by using the low fidelity model of the legged walking robot, the moment being given at the ZMP set by the (B) means by the approximate solution for the waist motion found by the (D) means;

(F) means for computing an approximate solution for an upper limb motion for canceling the yaw-axis moment calculated by the (E) means;

(G) means for calculating pitch-axis, roll-axis, and yaw-axis moments of the legged walking robot by using a high fidelity model of the legged walking robot, these moments being generated at the ZMP set by the (B) means during the whole-body motion calculated by the (D) means and the (F) means;

(H) means for determining a solution for the whole-body motion when the pitch-axis, roll-axis, and yaw-axis moments calculated by the (G) means are smaller than respective predetermined allowable values; and (I) means for modifying the moments at the preset ZMP based on the low fidelity model when the pitch-axis, roll-axis, and yaw-axis moments calculated by the (G) means are equal to or larger than the respective predetermined allowable values and for allowing the (D) means or the (F) means to use the modified moments.

5. The motion controller for the legged walking robot according to claim 4, wherein the low fidelity model is a linear and/or decoupling multi-mass-points model for the legged walking robot, and the high fidelity model is a rigid body model or a non-linear and/or interferential multi-masspoints approximation model.

6. The motion controller for the legged walking robot according to claim 4, further comprising (F') means for resetting and modifying the motion patterns of the trunk and the upper limbs when preset motions of the trunk and the upper limbs are not achieved by the approximate solutions found by the (D) means for computing an approximate solution for a waist motion and/or by the (F) means for computing an approximate solution for an upper limb motion.

7. The motion controller for the legged walking robot according to claim 4, wherein the (D) means for computing an approximate solution for the waist motion computes an approximate solution for the waist motion by solving an equation of equilibrium of the moments at the preset ZMP generated by the foot motion, the trunk motion, and the upper limb motion and a moment at the preset ZMP generated by a horizontal waist motion.

8. The motion controller for the legged walking robot according to claim 4, wherein the (D) means for computing an approximate solution for the waist motion performs an operation by replacing a function of time with a function of frequency.

9. The motion controller for the legged walking robot according to claim 4, wherein the (D) means for computing an approximate solution for the waist motion computes an approximate solution for the waist motion by calculating Fourier coefficients for a horizontal waist trajectory by applying Fourier series epansion for the moments at the preset ZMP generated by the foot motion, the trunk motion, and the upper limb motion and also by applying Fourier series expansion for a horizontal waist motion, and by applying inverse Fourier series expansion.

10. The motion controller for the legged walking robot according to claim 4, wherein the (F) means for computing an approximate solution for the upper limb motion computes an approximate solution for the upper limb motion by solving an equation of equilibrium of the moments at the preset ZMP generated by the foot motion and the trunk motion.

11. The motion controller for the legged walking robot according to claim 4, wherein the (F) means computing an approximate solution for the upper limb motion performs an operation by replacing a function of time with a function of frequency.

12. The motion controller for the legged walking robot according to claim 4, wherein the (F) means for computing an approximate solution for the upper limb motion computes an approximate solution for the upper limb motion by calculating Fourier coefficients by applying Fourier series expansion for the moments at the preset ZMP generated by the foot motion and the trunk motion, and by applying inverse Fourier series expansion.

13. A method for controlling a motion of a robot that comprises at least upper limbs, a trunk, and lower limbs and that performs a legged locomotion with the lower limbs, the controller comprising the steps of:

setting motions of at least one of the upper limbs, the trunk, and the lower limbs;

calculating a pitch-axis moment and/or a roll-axis moment of the body of the legged walking robot, these moments being generated at a preset ZMP by the set motions of the upper limbs, the trunk, and the lower limbs;

calculating motions of the lower limbs and the trunk for canceling the pitch-axis moment and/or the roll-axis moment;

calculating a yaw-axis moment of the body of the legged walking robot, the moment being generated at the preset ZMP by the calculated motions of the lower limbs and the trunk;

calculating a motion of the upper limbs for canceling the yaw-axis moment; and modifying the set motions of the upper limbs, the trunk, and the lower limbs in accordance with the calculated motions of the upper limbs, the trunk, and the lower limbs.

14. The method for controlling the motion of the legged walking robot according to claim 13, wherein each of the upper limbs comprises a shoulder joint and an elbow joint, each having at least one rotational degree of freedom, and the motion of the upper limbs for canceling the yaw-axis moment is a motion generated by driving the shoulder joints and/or the elbow joints.

15. A method for controlling a motion of a robot that comprises at least upper limbs, a trunk, and lower limbs and that performs a legged locomotion with the lower limbs, the controller comprising the steps of:

(a) setting at least one of a foot motion, a trunk motion, an upper limb motion, and an attitude and a height of a waist for achieving a requested motion;

(b) setting a ZMP trajectory based on the foot motion set in the (a) step;

(c) calculating pitch-axis and roll-axis moments of the legged walking robot, these moments being generated at the ZMP set in the (b) step by the foot motion, the trunk motion, and the upper limb motion set in the (a) step;

(d) computing a solution for a waist motion for canceling the pitch-axis and roll-axis moments calculated in the (c) step;

(e) calculating a yaw-axis moment of the legged walking robot, the moment being generated at the ZMP set in the (b) step by the waist motion solved in the (d) step;

(f) computing a solution for an upper limb motion for canceling the yaw-axis moment calculated in the (e) step; and (g) deriving a whole-body motion of the legged walking robot based on the waistt motion and the upper limb motion solved in the (d) step and the (f) step, respectively.

16. A method for controlling a motion of a robot that comprises at least upper limbs, a trunk, and lower limbs and that performs a legged locomotion with the lower limbs, the controller comprising the steps of:

(A) setting at least one of a foot motion, a trunk motion, an upper limb motion, and an attitude and a height of a waist for achieving a requested motion;

(B) setting a ZMP trajectory based on the foot motion set in the (A) step;

(C) calculating pitch-axis and roll-axis moments of the legged walking robot by using a low fidelity model of the legged walking robot, these moments being generated at the ZMP set in the (B) step by the foot motion, the trunk motion, and upper limb motion set in the (A) step;

(D) computing an approximate solution for a waist motion for canceling the pitch-axis and roll-axis moments calculated in the (C) step;

(E) calculating a yaw-axis moment of the legged walking robot by using the low fidelity model of the legged walking robot, the moment being given at the ZMP set in the (B) step by the approximate solution for the waist motion found in the (D) step;

(F) computing an approximate solution for an upper limb motion for canceling the yaw-axis moment calculated in the (E) stop;

(G) calculating pitch-axis, roll,-axis, and yaw-axis moments of the legged walking robot by using a high fidelity model of the legged walking robot, these moments being generated at the ZMP set in the (B) stop during the whole-body motion calculated in the (D) step and the (F) step;

(H) determining a solution for the whole-body motion when the pitch-axis, roll-axis, and yaw-axis moments calculated in the (G) step are smaller than respective predetermined allowable values; and (I) modifying the moments at the preset ZMP based on the low fidelity model when the pitch-axis, roll-axis, and yaw-axis moments calculated in the (G) step are equal to or larger than the respective predetermined allowable values and for allowing the (D) step or the (F) step to use the modified moments.

17. The method for controlling the motion of the legged walking robot according to claim 16, wherein the low fidelity model is a linear and/or decoupling multi-masspoints model for the legged walking robot, and the high fidelity model is a rigid body model or a non-linear and/or interferentiall multi-mass-points approximation model.

18. The method for controlling the motion of the legged walking robot according to claim 16, further comprising (F') the step of resetting and modifying the motion patterns of the trunk and the upper limbs when preset motions of the trunk and the upper limbs are not achieved by the approximate solutions found in the (D) step for computing an approximate solution for a waist motion and/or in the (F) step for computing an approximate solution for an upper limb motion.

19. The method for controlling the motion of the legged walking robot according to claim 16, wherein the (D) stop for computing an approximate solution for the waist motion computes an approximate solution for the waist motion by solving an equation of equilibrium of the moments at the preset, ZMP generated by the foot motion, the trunk motion, and the upper limb motion and a moment at the preset ZMP generated by a horizontal waist motion.

20. The method for controlling the motion of the legged walking robot according to claim 16, wherein the (D) step for computing an approximate solution for the waist motion performs an operation by replacing a function of time with a function of frequency.

21. The method for controlling the motion of the legged walking robot according to claim 10, wherein the (D) step for computing an approximate solution for the waist motion computes an approximate solution for the waist motion by calculating Fourier coefficients for a horizontal waist trajectory by applying Fourier series expansion for the moments at the preset ZMP generated by the foot motion, the trunk motion, and the upper limb motion and also by applying Fourier series expansion for a horizontal waist motion, and by applying inverse Fourier series expansion.

22. The method for controlling the motion of the legged walking robot according to claim 16, wherein the (F) step for computing an approximate solution for the upper limb motion computes an approximate solution for the upper limb motion by solving an equation of equilibrium of the moments at the preset ZMP generated by the foot motion and the trunk motion.

23. The method for controlling the motion of the legged walking robot according to claim 16, wherein the (F) step for computing an approximate solution for the upper limb motion performs an operation by replacing a function of time with a function of frequency.

24. The method for controlling the motion of the legged walking robot according to claim 16, wherein the (F) step for computing an approximate solution for the upper limb motion computes an approximate solution for the upper limb motion by calculating Fourier coefficients by applying Fourier series expansion for the moments at the preset ZMP generated by the foot motion and the trunk motion, and by applying inverse Fourier series expansion.

* * * * *